(12) United States Patent
Gadelrab

(10) Patent No.: US 7,813,342 B2
(45) Date of Patent: Oct. 12, 2010

(54) METHOD AND APPARATUS FOR WRITING NETWORK PACKETS INTO COMPUTER MEMORY

(76) Inventor: Serag Gadelrab, 9 Hastings Drive, Markham, ON (CA) L3R 4Y5

(*) Notice: Subject to any disclaimer, the term of this patent is extended or adjusted under 35 U.S.C. 154(b) by 285 days.

(21) Appl. No.: 12/044,946

(22) Filed: Mar. 8, 2008

(65) Prior Publication Data

US 2008/0240111 A1 Oct. 2, 2008

Related U.S. Application Data

(60) Provisional application No. 60/919,857, filed on Mar. 26, 2007.

(51) Int. Cl.
*H04L 12/28* (2006.01)
(52) U.S. Cl. ...................................................... 370/389
(58) Field of Classification Search ........................ None
See application file for complete search history.

(56) References Cited

U.S. PATENT DOCUMENTS

| | | | | |
|---|---|---|---|---|
| 6,076,103 A | * | 6/2000 | Sakai | 709/217 |
| 2005/0207437 A1 | * | 9/2005 | Spitzer | 370/412 |
| 2005/0226238 A1 | * | 10/2005 | Hoskote et al. | 370/389 |
| 2005/0249228 A1 | * | 11/2005 | Cornett | 370/413 |
| 2006/0045090 A1 | * | 3/2006 | Ronciak et al. | 370/392 |
| 2006/0171310 A1 | * | 8/2006 | Ahluwalia et al. | 370/229 |
| 2006/0251109 A1 | * | 11/2006 | Muller et al. | 370/463 |
| 2007/0050548 A1 | * | 3/2007 | Bali et al. | 711/118 |
| 2008/0028103 A1 | * | 1/2008 | Schlansker et al. | 709/250 |
| 2008/0181245 A1 | * | 7/2008 | Basso et al. | 370/412 |

* cited by examiner

*Primary Examiner*—Chirag G Shah
*Assistant Examiner*—Amarnauth Persaud

(57) ABSTRACT

An apparatus receives packets from a network and inserts the packet data into the memory of a computer system. The invention reduces the amount of computer system memory bandwidth required to receive packets through the use of a retained data buffer. Packet headers and a summary of packet validation results are processed by network stacks within the computer system to identify the intended memory buffer in which the packet payload is to be placed. Packet payload data is directly placed from the retained data buffer to the intended memory buffer without the use of intermediate buffers. A preferred embodiment includes a data retention network interface card (DRNIC) which includes the required data retention buffer for use in direct placement of received data.

25 Claims, 12 Drawing Sheets

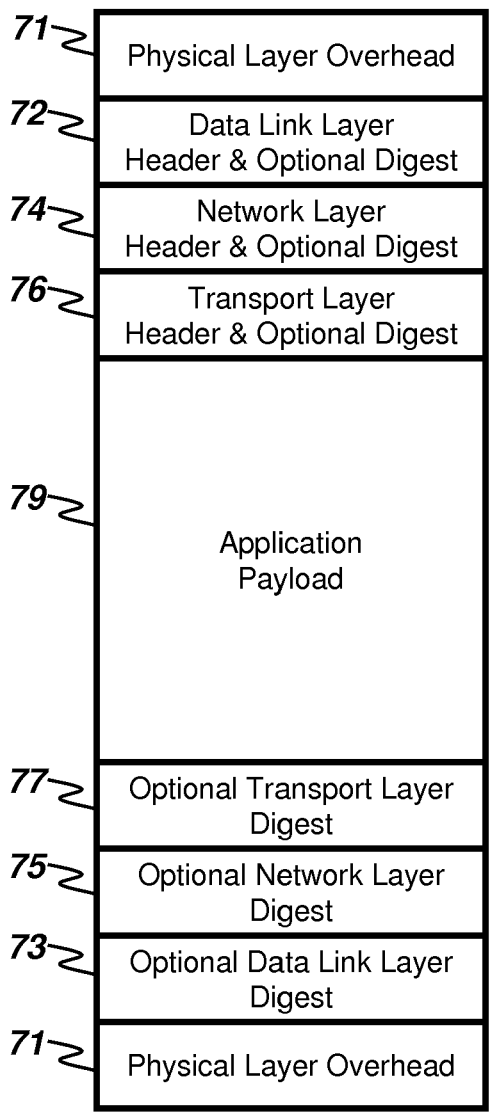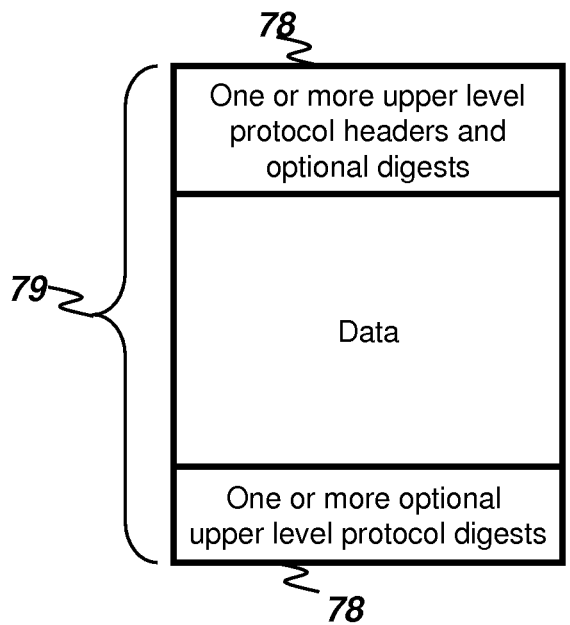
FIG. 2(a)
FIG. 2(b)

METHOD AND APPARATUS FOR WRITING NETWORK PACKETS INTO COMPUTER MEMORY

CROSS-REFERENCE TO RELATED APPLICATIONS

The present application claims priority of U.S. Provisional Application Ser. No. 60/919,857 entitled "METHOD AND APPARATUS FOR WRITING NETWORK PACKETS INTO COMPUTER MEMORY" filed 26 Mar. 26, 2007, which is incorporated herein by reference and for all purposes.

FIELD OF INVENTION

The present invention relates to computer networks, and more particularly, to the methods and apparatus by which network packets that arrive at a computer are written into the computer's memory. The present invention is particularly concerned with reducing the number of computer memory read and write operations required to insert arriving network packets into the computer memory.

BACKGROUND ART

FIG. 1 is a block diagram representation of an exemplary computer system that receives and transmits packets using a network connection. FIG. 1 shows the path taken by incoming network packets that arrive from the physical receive network links 1 and travel from the Network Interface Controller (NIC) 10 to their ultimate destination in the Computer Memory 20. FIG. 1 also shows the path taken by outgoing network packets that travel from the Computer Memory 20 to the physical transmit network link 2 through the Network Interface Controller (NIC) 10. The Network Interface Controller 10 is linked to the Computer Memory 20 through the Computer Interconnect Network 30. Access to the Computer Memory 20 is controlled by the Memory Controller 40. The computer also contains a Computer Processor Unit 45 on which the operating system and application software executes. The NIC 10, Memory Controller 40, Computer Interconnect Network 30, and Computer Processor Unit 45 functions may be partitioned and implemented in one or more integrated circuits.

FIG. 2(a) illustrates the components of an exemplary network packet which travels over the physical network and is processed by computer systems such as that shown in FIG. 1. The packet data is composed of an Application Payload 79 which is encapsulated in several layers of protocols in accordance with the well known Open Systems Interconnection (OSI) networking model. The physical layer protocol is the outermost level of encapsulation; it introduces Physical Layer Overhead 71 that allows transmission of the packet data on various physical media. Examples of physical layer protocols are 8b/10b and 66b/64b encoding, XAUI protocol and various scrambling methods. Data link layers, such as Ethernet, are the second level of encapsulation; the data link protocol layer is usually composed of the Data Link Protocol Header and Optional Digest 72 as well as an optional Data Link Layer Digest 73 that is used to detect transmission errors. Network protocol layers, such as the Internet Protocol (IP), are the third level of encapsulation; the network protocol layer is usually composed of the Network Layer Header and Optional Digest 74 as well as an optional Network Layer Digest 75. Transport protocol layers, such as the Transmission Control Protocol (TCP), are the fourth level of encapsulation; the transport protocol layer is usually composed of the Transport Layer Header and Optional Digest 76 as well as an optional Transport Layer Digest 77. FIG. 2(b) shows an exemplary Application Payload 79 which is composed of a Data segment that can be optionally encapsulated within one or more Upper Layer Protocol Headers and optional Digests 78.

A typical NIC 10 contains a Packet Transmit Function 17 which allows encapsulation and transmission of outgoing packets on to physical transmit network link 2.

The present invention pertains to the process of receiving packets from the physical receive network link 1. Examining the typical packet receive functional blocks of a Network Interface Controller (NIC) 10, packets arriving from the physical receive network link 1 are first processed by the Receive Physical Layer Block (PHY) 11 which inspects, checks and removes the physical layer protocol overhead 71. Once an arriving packet is extracted from its physical encapsulation protocol layer, it is forwarded to the Media Access Controller (MAC) block 12 which checks and validates the data link layer protocol through examination of the protocol header 72 and digest 73 in relation to the packet data. The MAC Block 12 can also validate the integrity of the network and transport protocol layers through examination of the protocol headers (74 and 76) and digests (75 and 77) in relation to the packet data. The MAC 12 propagates the packet, and the results of the said validations, to the Packet Classifier (PC) 14. The MAC may optionally discard packets without forwarding them to the Packet Classifier (PC) 14 when errors are found in one or more protocol layers. For example in a network using Ethernet for the data link layer, Internet Protocol (IP) for the network layer and the Transport Control Protocol (TCP) for the transport layer, the MAC Block 12 may perform header and digest validation, and protocol checks, for the Ethernet, IP, and TCP protocols.

The Packet Classifier (PC) 14 block inspects arriving packets and determines whether the packets are to be maintained, quarantined or discarded based on a set of user defined rules pertaining to packet length, type, validity of the different protocol headers, and content of the protocol headers for data link, network, transport and upper level protocol layers. Application of these rules represents a firewall function. Quarantine packets are identified by attaching a special tag to them and/or by placing them into a special quarantine queue within the Packet Data Buffer 13.

Each arriving packet that is not discarded by the MAC 12 or Packet Classifier 14 is stored, along with the result of the classification and protocol validation operations performed on the packet, in the Packet Data Buffer (PDF) 13. The Packet Data Buffer 13 may function as a single queue that stores and forwards all incoming packets in a first-in first-out manner. Alternatively, the Packet Data Buffer 13 may be subdivided into multiple queues in which arriving packets are inserted using one or more packet classification methods. In the case of the Packet Data Buffer 13 being subdivided into multiple queues, each of these queues forwards their specific packets in a first-in first-out manner without regard to other queues.

In the case of Packet Data Buffer 13 being subdivided into multiple queues, the Packet Classifier 14 block determines the target queue within the Packet Data Buffer 13 for each arriving packet based on items such as its packet length, type, validity of the different protocol headers, and the content of the protocol headers for data link, network, transport and upper level protocol layers. The result of this classification determines the specific queue in which the arriving packet is to be written within the Packet Data Buffer 13.

The Packet Buffer Manager 16 block manages the process of writing and reading packets into the Packet Data Buffer 13 including monitoring the level of buffer fill and taking appropriate measures, such as selectively discarding or accepting packets destined for the Packet Data Buffer 13 to maintain an appropriate fill level. In the case of the Packet Data Buffer 13 being subdivided into multiple queues, the Packet Buffer Manager 16 manages the process of writing and reading packets into each queue within the Packet Data Buffer 13 including monitoring the fill level of each queue and taking appropriate measures, such as selectively discarding or accepting packets destined for each of the queues to maintain an appropriate fill level.

Packets residing in the Packet Data Buffer 13 are transferred to the Computer Memory 20 through a cooperative effort between the software entities depicted in FIG. 3 and the NIC 10. Software layers existing in the Kernel Space Software Layer (KSSL) 50 of the operating system are the NIC Driver 51, Network Stack 52, and Socket Layer 53. One or more User Application 61 software layers exist in the User Space Software Layer (USSL) 60 of the operating system. A User Application 61 is the software layer which is the final processing destination of any given Application Payload 79. Within the Computer Memory 20 there exists a plurality of Kernel Space Buffers 54 for use by the different software layers within the KSSL 50 and a plurality of User Space Buffers 62 for use by user space software layers such as User Application 61 software layers. To facilitate the transfer of arriving packets from the NIC 10 to the Computer Memory 20, the NIC Driver 51 reserves a plurality of Kernel Space Buffers 54 in which the NIC 10 can write the contents of the arriving packets. All Kernel Space Buffers 54 which are reserved by the NIC Driver 51 and in which the NIC 10 can write packets will also be referred to herein as Kernel Packet Buffers (KPB) 59. If an arriving packet length is larger than the size of the associated Kernel Packet Buffer (KPB) 59, the NIC 10 divides the packet up into smaller data segments that match the size of the available KPBs 59 and then writes the packet segments into several different KPBs 59. KPBs 59 may reside in contiguous memory addresses or may be located at disparate locations in the Computer Memory 20.

The NIC Driver 51 informs the NIC 10 of the starting address and length of each available KPB 59 through a Buffer Descriptor Data Structure (BDDS) 55. FIG. 4(a) shows a typical organization for a Buffer Descriptor Data Structure 55. Within the Buffer Descriptor Data Structure 55, the NIC Driver 51 enters the starting address and length of one Kernel Packet Buffer 59 in each of the Kernel Buffer Fields 70. Each Buffer Descriptor Data Structure (BDDS) 55 may contain one or more Kernel Buffer Fields 70. Within the Buffer Descriptor Data Structure 55, the NIC Driver 51 also enters the Descriptor Ready Flag 57 to indicate that the Descriptor is ready for use by the NIC 10, as well as NIC Driver Private Data 70 that the NIC Driver 51 requires for future use such as determining the virtual addresses of each KPB 59 within the BDDS 55. Each Buffer Descriptor Data Structure 55 contains a Packet Information Area 56 which is left empty by the NIC Driver 51. During the course of its operation, the NIC 10 fills the Packet Information Area 56 with information specific to the incoming packet associated with the BDDS 55 such the packet length, packet header types, results of protocol validation and classification, and all other information required by software layers within the Kernel Space Software Layer 50 to process the packet.

Buffer Descriptor Data Structures 55 are conveyed to the NIC 10 by writing one or more BDDS's 55 into a Kernel Space Buffer 54 as depicted in FIG. 4(b). Herein, we refer a the Kernel Space Buffer 54 that contain Buffer Descriptor Data Structures 55 as Kernel Descriptor Buffer (KDB) 80. KDBs 80 may reside in contiguous memory addresses or may be located at disparate locations in the Computer Memory 20. If KDBs 80 reside in contiguous memory addresses, the NIC Driver 51 provides the address of the first KDB 80 and the length of the contiguous memory space occupied by KDBs 80 to the Direct Memory Access Engine (DMA Engine) 15 located within the NIC 10. If the KDBs 80 reside in disparate memory addresses, each must contain an optional Next KDB Pointer 81 that points to the address of the next KDB 80. In this case the NIC Driver 51 provides the address of the first KDB 80 to the Direct Memory Access Engine (DMA Engine) 15 located within NIC 10. The Direct Memory Access Engine 15 then uses the Next KDB Pointer 81 to locate the next KDB. In the case where the NIC 10 stores the arriving packets in a plurality of queues, the NIC Driver 51 provides a unique set of Buffer Descriptor Data Structures 55 for each of these queues. Each of these unique sets of Buffer Descriptor Data Structures 55 is contained within a unique set of KDBs 80.

The availability of the valid Buffer Descriptor Data Structures 55 can be conveyed to the NIC 10 by many ways that those skilled in the art can appreciate. Exemplary methods to achieve this include having the kernel space software layer 50 write a message, or a fragment of a KDB 80, or the address of the KDB 80 to a doorbell register or memory within the NIC 10. Alternative exemplary methods to achieve this include having the NIC 10 poll the KDB 80 address provided by the kernel space software layer 50 or a special memory location within the Computer Memory 20 that is used for communication between the NIC 10 and the kernel space software layer.

To transfer the arriving packets from the NIC 10 to the KPBs 59, the DMA Engine 15 uses the available KDB 80 address for each of the queues within the Packet Data Buffer 13 to read one or more Buffer Descriptor Data Structures 55 for each of the Packet Data Buffer 13 queues from the Computer Memory 20. The DMA Engine 15 stores a local copy of each Buffer Descriptor Data Structure 55 and modifies the content of this local copy as part of its normal operation. The DMA Engine 15 can only process Buffer Descriptor Data Structures 55 that possess a valid Descriptor Ready Flag 57. If a BDDS 55 with an invalid Descriptor Ready Flag 57 is encountered, the DMA Engine 15 will not process this BDDS 55 until a subsequent time when its Descriptor Ready Flag 57 is found to be in the valid state. For each BDDS 55 with a valid Descriptor Ready Flag 57, the DMA Engine 15 queries the Packet Buffer Manager 16 block to ascertain the availability of packets in the Packet Data Buffer 13. The Packet Buffer Manager 16 reads each available packet from the Packet Data Buffer 13 and passes it to the DMA Engine 15 which writes it into one or more of the KPBs 59 listed in the Kernel Buffer Fields 70 of the valid BDDS 55 within the Computer Memory 20. The DMA Engine 15 modifies the local copy of the Buffer Descriptor Data Structure 55 associated with each packet that is written to the Computer Memory 20, filling in the Packet Information Area 56 with packet information such as packet length, packet header types, results of protocol validation and classification, and all other information required by the software layers within the KSSL 50 to process the packet. The DMA Engine 15 then modifies the Descriptor Ready Flag 57 to indicate that the BDDS 55 is ready for processing by the NIC Driver 51 software layer 51. Finally, the DMA Engine 15 writes back the modified Buffer Descriptor Data Structure 55 into its original location within its KDB 80 in the Computer Memory 20. Once one or more modified Buffer Descriptor Data Structure(s) 55 are written back to the Computer Memory 20, the NIC 10 will interrupt the operating system to inform it of the availability of new packets in the KPBs 59.

In the case where multiple packet queues exist within the Packet Data Buffer 13, the DMA Engine 15 and the Packet Buffer Manager 16 arbitrate between all queues of the Packet Data Buffer 13 such that they are all serviced in a fair manner.

As more packets arrive, the DMA Engine 15 reads the next group of Buffer Descriptor Data Structures 55 for each of the queues in the Packet Data Buffer 13 from the Computer Memory 20. The DMA Engine 15 continues to access successive available packets from the Packet Data Buffer 13 and to write them into one or more available KPB in the Computer Memory 20. If the DMA Engine 15 encounters a Buffer Descriptor Data Structure 55 with an invalid Descriptor Ready Flag 57, it continues to poll that Buffer Descriptor Data Structure 55 by reading the same location of the Kernel Descriptor Buffers (KDB) 80 until it reads a Buffer Descriptor Data Structure 55 with a valid Descriptor Ready Flag 57.

The operating system routes the NIC's interrupt to the NIC Driver 51 software layer. This layer examines the KDBs 80 for each of the packet queues and identifies all newly arrived packets as represented by their Buffer Descriptor Data Structures 55 and corresponding KPBs 59. For each received packet, the NIC Driver 51 transfers the corresponding information, such as the Packet Information Area 56 and pointers to the Kernel Packet Buffer(s) 59 that hold the packet, to the Network Stack 52. The Network Stack 52 software layer is composed of several constituent protocol sub-stacks. Each sub-stack processes and manages a specific network layer and its corresponding protocol. For example, to process packets carrying Ethernet, IP and TCP protocols as the data link, network and transport protocols, respectively, the Network Stack 52 software layer will be made up of intercommunicating sub-stacks where one of the sub-stacks processes the Ethernet protocol, another sub-stack processes the IP protocol and yet another sub-stack processes the TCP protocol. Additional protocol sub-stacks may also be present within the Network Stack 52 layer to process additional upper level protocol header and digests 78. For example, an iSCSI sub-stack may be present within the Network Stack 52 to further process an incoming packet prior to transferring the payload to a User Application 61 software layer. The Network Stack 52 software layer operates on the packet data present in the Kernel Packet Buffer(s) 59 ensuring that the data is valid and removing the packet overhead (headers and optional digests). In doing so, each sub-stack chooses to accept part or all of the packet data. Upon completing its execution, the Network Stack 52 software layer transfers to the Socket Layer 53 one or more pointers to the valid portions of the Application Payload 79 data present within the Kernel Packet Buffer (s) 59 as well as any information required by the Socket Layer 53 to associate the valid portions of the Application Payload 79 to a specific User Application 61 and its User Space Buffer(s) 62.

User Application 61 software layers are not usually allowed to access Kernel Space Buffers 54, such as KPBs 59, and therefore can not access Application Payload 79 data that reside in the Kernel Packet Buffer(s) 59. The Socket Layer 53 must therefore copy the Application Payload 79 data from the Kernel Packet Buffer(s) 59 to the User Space Buffer(s) 62 of a User Application 61 software layer. The Socket Layer 53, which executes on the Computer Processor Unit 45, reads the valid portions of the Application Payload 79 data from the Kernel Packet Buffer(s) 59 within the Computer Memory 20 to the Computer Processor Unit 45 and then writes the same data to the appropriate User Space Buffer 62 which also resides in the Computer Memory 20. These data moving actions constitute a "copy" operation where data is being copied from one location in the Computer Memory 20 to another different location in the Computer Memory 20. This copy operation is undesirable because it consumes bandwidth resources from the Computer Memory 20, the Computer Interconnect 30 which moves the data between the Computer Memory 20, and the Computer Processor Unit 45. Another undesirable trait of the copy operation is that it also consumes some of the available processing cycles of the Computer Processor Unit 45. In some prior art, a Copy Engine 31 is placed within the Computer Interconnect Subsystem 30 to relieve the Computer Processor Unit 45 from having to perform the copy operation itself. In that prior art, the software running on the Computer Processor Unit 45 instructs the Copy Engine 31 to read the valid portion of the Application Payload 79 data from the Kernel Packet Buffer(s) 59 and then write the same data to the appropriate User Space Buffer 62 without the direct involvement of the Computer Processor Unit 45. While this prior art method reduces the impact of the copy operation on the Computer Processor Unit 45, it does not address or solve the problem of bandwidth usage of the Computer Memory 20 during the copy operation.

In the prior art, the Application Payload 79 traverses the Memory Controller three times: first when it is written into the Kernel Packet Buffers 59 by the DMA Engine 15, second when it is read by the different software layers within the Kernel Space Software Layer 50, and third when it is written into the User Space Buffer(s) 62. Therefore, a need remains in the art for a method and apparatus that reduces or eliminates this three-fold usage of Computer Memory 20 bandwidth associated with writing the arriving Application Payload 79 data into the corresponding User Space Buffer(s) 62.

BRIEF DESCRIPTION OF THE DRAWINGS

The present invention will be further understood from the following detailed description given below and from the accompanying drawings of the embodiments of the invention which, however, should not be taken to limit the invention to the specific embodiments described, but are for explanation and understanding only.

FIG. 2(a) is a block diagram representation of an exemplary network packet which travels over the physical network and which can be processed by both prior art systems and systems incorporating embodiments of the present invention.

FIG. 2(b) is a block diagram representation of an exemplary Application Layer segment of a network packet which travels over the physical network and which can be processed by both prior art systems and systems incorporating embodiments of the present invention.

DETAILED DESCRIPTION OF THE PREFERRED EMBODIMENT

The present invention is a method and apparatus that reduces the usage of Computer Memory 20 bandwidth associated with writing data contained in the Application Payload 79 of arriving packets into the corresponding User Space Buffer(s) 62.

In general, the architectural premise of the present invention is that all information required by packet processing software layers within the KSSL 50, to process the arriving packets, to determine the amount of Application Payload 79 to be written into User Space Buffers 62, and to locate the User Space Buffers that the Application Payload 79 data is to be written into, can be obtained from the different protocol headers of each packet and from the validation operations associated with each of the packet protocols. The present invention reduces the amount of used Computer Memory 20 bandwidth for some or all arriving packets by performing protocol validation and writing the protocol headers of the said packets to the Kernel Packet Buffers 59 without writing some or all of the Application Payload 79 data into the said Kernel Packet Buffers 59. The portions of the packets that are not written into the Kernel Packet Buffers 59 are retained in a Retained Data Buffer 422. Once software layers within the KSSL 50 determines the location in which the Application Payload 79 data is to be written within the Computer Memory 20 the retained Application Payload 79 data is written from the Retained Data Buffer 422 directly to the User Space Buffers 62 in the Computer Memory 20 through the operation of a Retained Data Write Processor 423. Using the present method, some or all Application Payload 79 data traverses the Computer Memory 20 and the Memory Controller 40 interface only once or twice instead of three times as in prior art.

Figure 1:
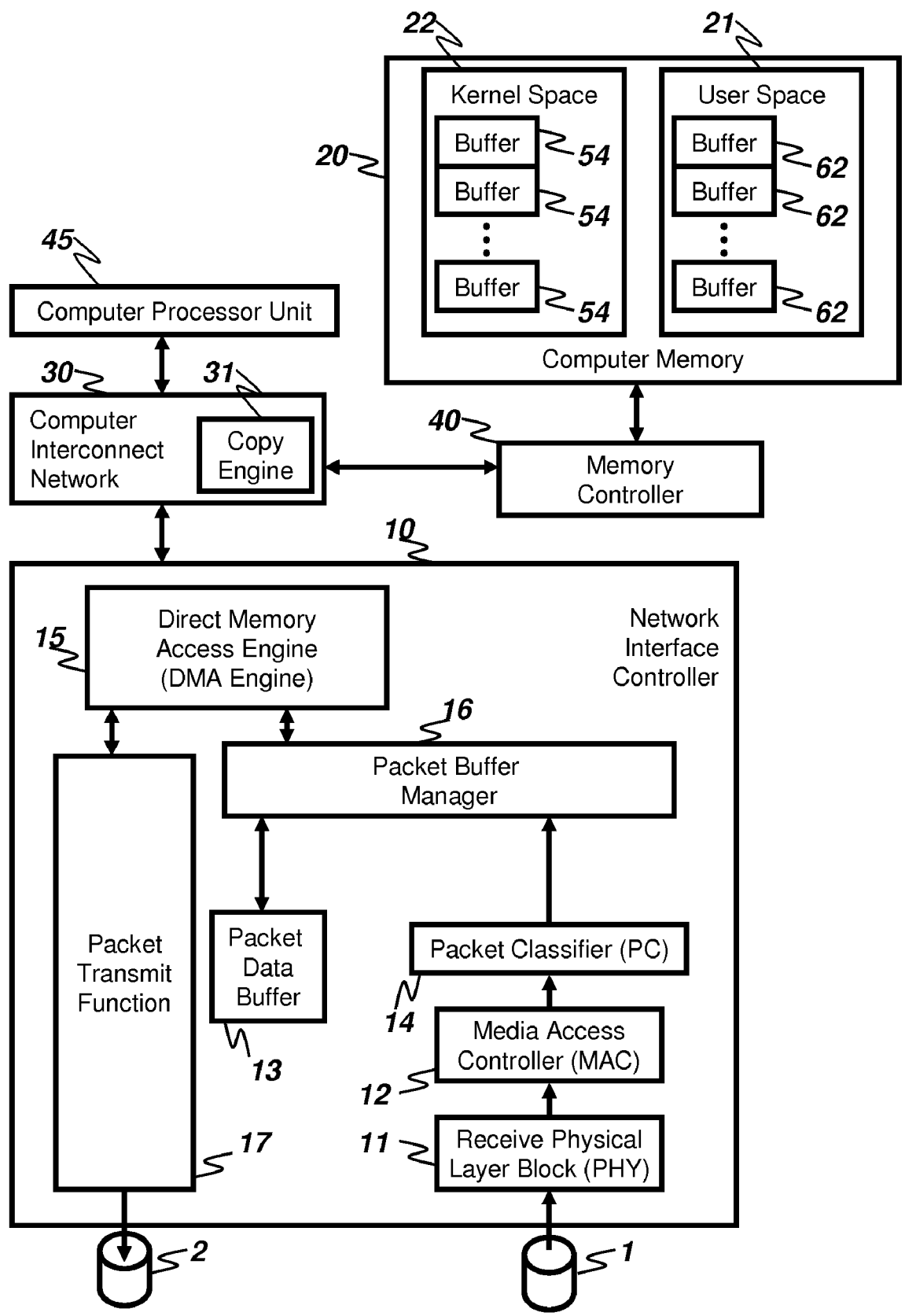
FIG. 1 is a block diagram representation of an exemplary prior art computer system that receives and transmits packets using a network connection.
Figure 3:
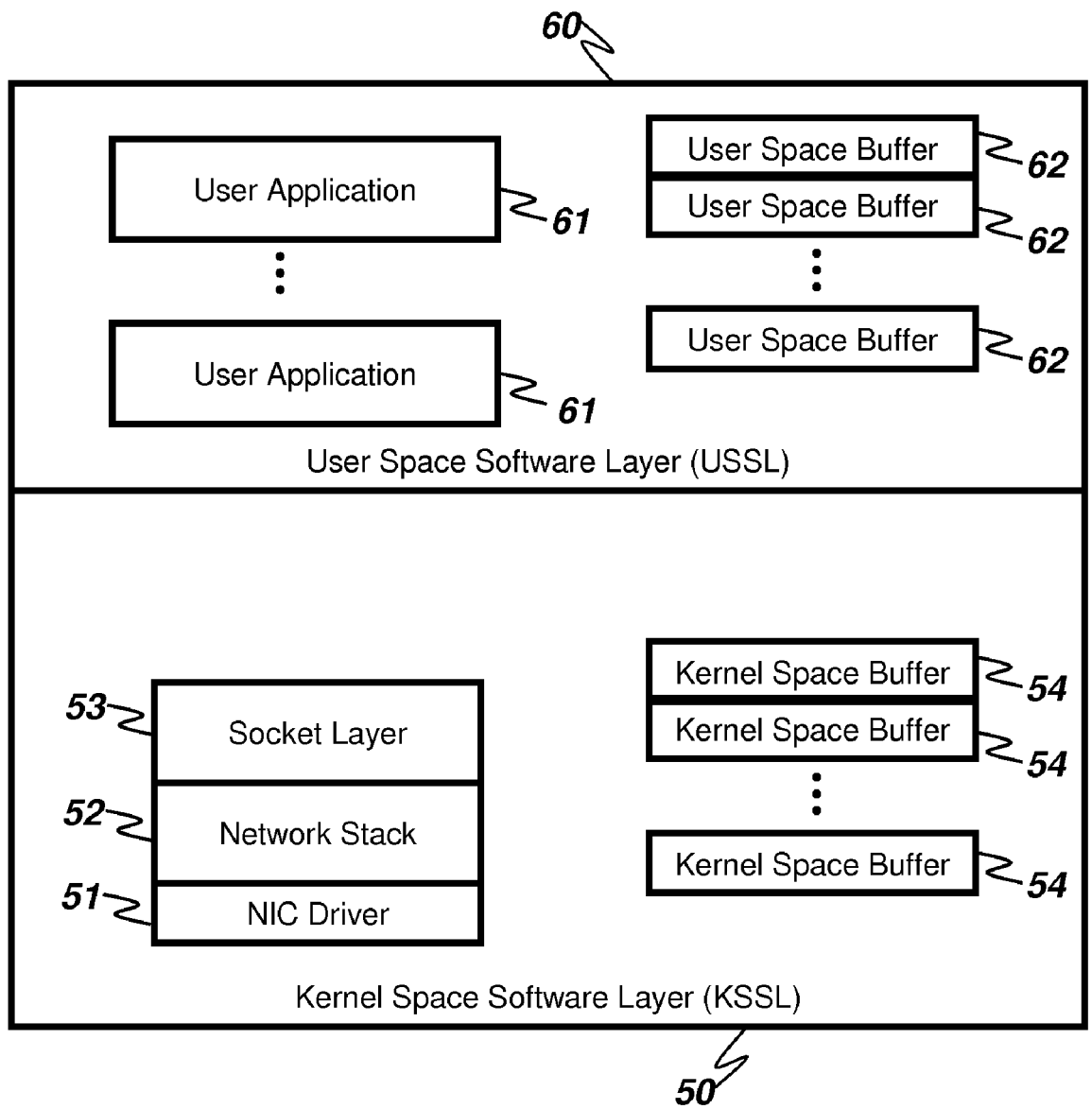
FIG. 3 is a block diagram representation of exemplary prior art software layers and data buffers that can process arriving and departing network packets.
Figure 4A:
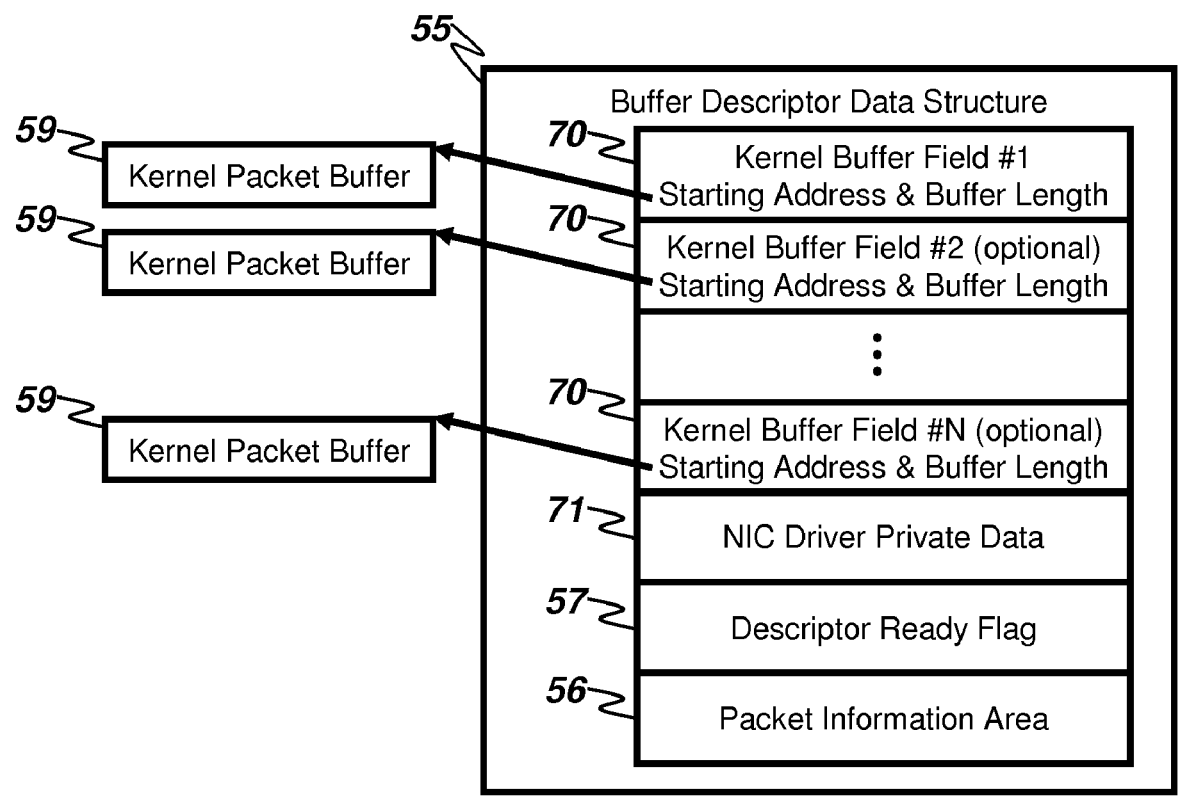
FIG. 4(a) is a block diagram representation of an exemplary prior art Buffer Descriptor Data Structure that is used to convey information relating to arriving network packets between the Network Interface Controller and the software layers that process the arriving network packets within the operating system.
Figure 4B:
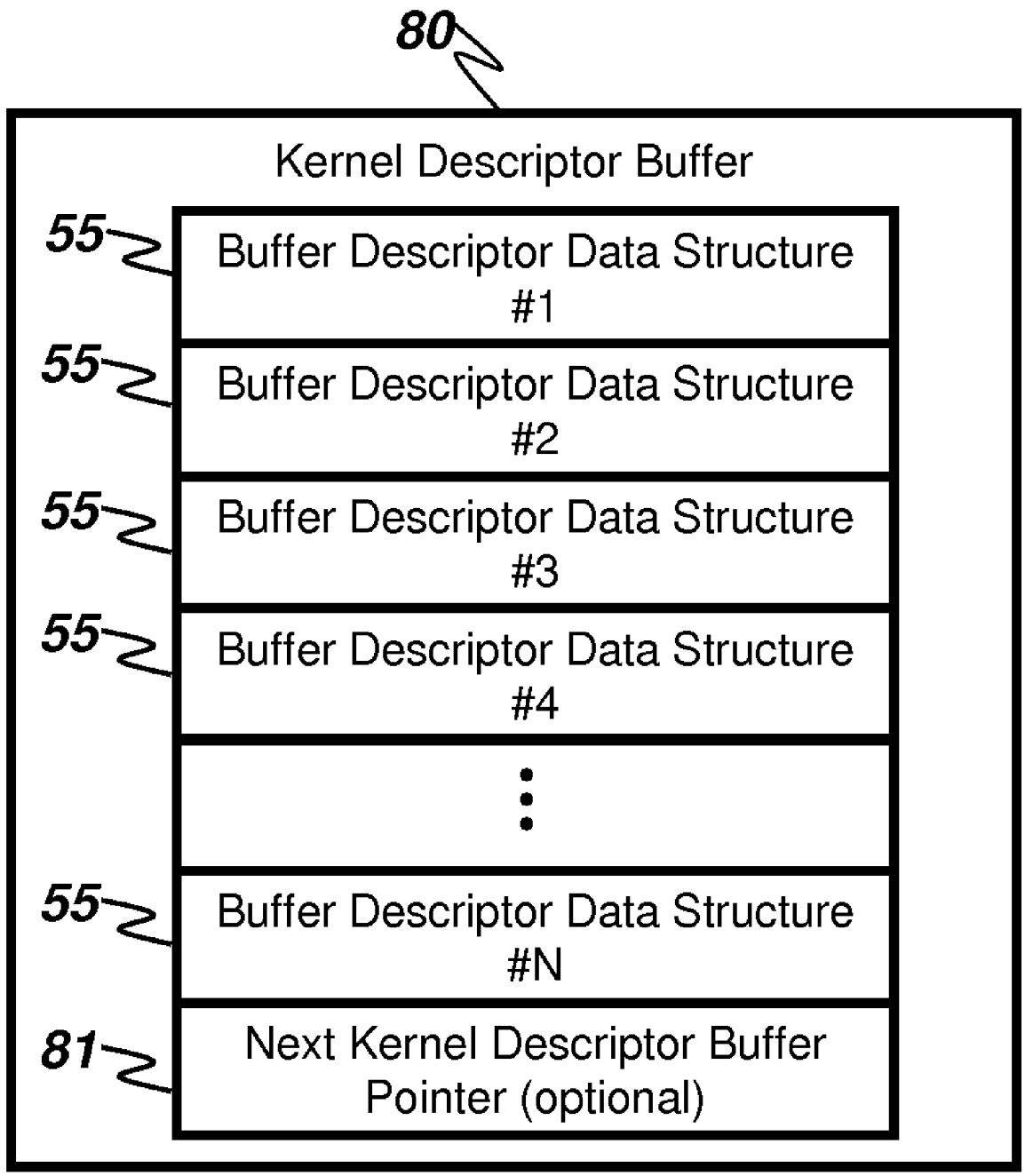
FIG. 4(b) is a block diagram representation of an exemplary prior art Kernel Descriptor Buffer data structure that is used to convey Buffer Descriptor Data Structures between the Network Interface Controller and the software layers that process the arriving network packets within the operating system.
Figure 5:
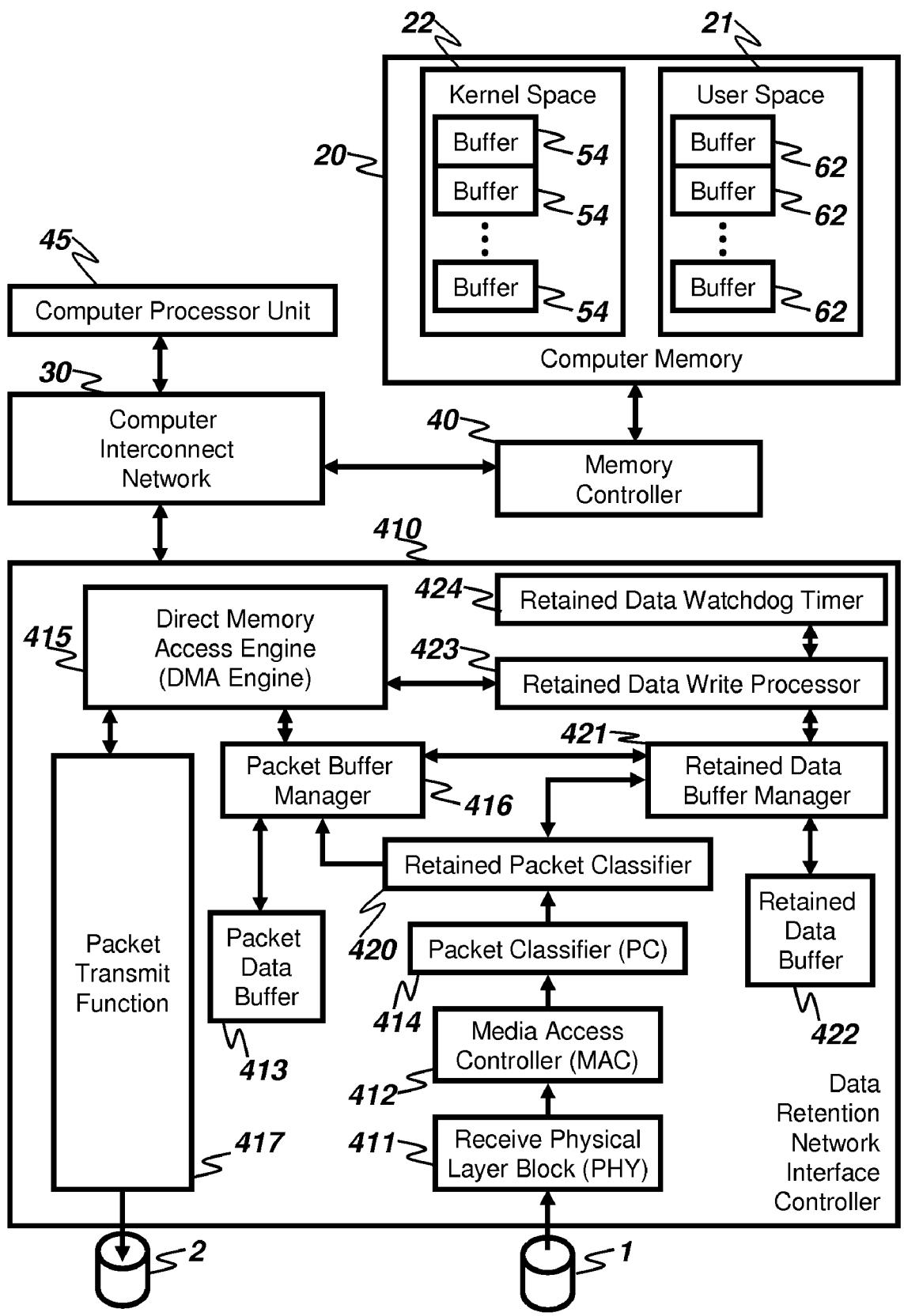
FIG. 5 is a block diagram representation of a computer system that receives and transmits packets using a network connection according to some embodiments of the present invention.

FIG. 5 shows a preferred embodiment of the present invention within a computer system. In FIG. 5, the Data Retention Network Interface Controller (DRNIC) 410 contains specific blocks that allow for retention of selective packet data and direct writing of said retained data into the Computer Memory 20. The functions of the Receive Physical Layer Block (PHY) 411 and the Media Access Controller Block 412 are similar to their name-sake blocks of FIG. 1. The MAC 412 performs digest validation and protocol checks for the data link, network and transport layers and then forwards the packet to the Packet Classifier block 414 for eventual storage into the Packet Data Buffer 413 and, in some cases, the Retained Data Buffer 422. The results of the validation and checking operations are also forwarded along with the packet for eventual storage in the Packet Data Buffer 413.

The Packet Classifier (PC) 414 block inspects arriving packets and determines whether the packets are to be maintained, quarantined or discarded based on a set of user defined rules pertaining to packet length, type, the validity of the different protocol headers, and, the content of the protocol headers for data link, network, transport and upper level protocol layers. Application of these rules represents a firewall function. Quarantine packets are identified by attaching a special tag to them and/or by placing them into a special quarantine queue within the Packet Data Buffer 413.

In the case of the Packet Data Buffer 413 being subdivided into multiple queues, the Packet Classifier 414 block determines the target queue for each arriving packet based on items such as its packet length, type, the validity of the different protocol headers, and, the content of the protocol headers for data link, network, transport and upper level protocol layers. The result of this classification determines the specific queue in which the arriving packet is to be written into within the Packet Data Buffer 413.

In the present invention, the packet is then processed by the Retained Packet Classifier block 420 which determines if the packet data is eligible to be retained within the DRNIC 410 prior to writing the entire packet or parts thereof into the Packet Data Buffer 413 and, eventually, to the Kernel Packet Buffers 59 within the Computer Memory 20.

The Retained Packet Classifier (RPC) block 420 is programmed to use one or more criteria to determine whether data from the arriving packet data should be retained. These criteria include, but are not limited to, packet length and the header fields of the data link, network, transport and upper level protocol layers. The Retained Packet Classifier 420 can be programmed to use one or more methods to identify candidates for data retention. First, the Retained Packet Classifier can be instructed to search for a programmable number of protocol header fields within a ternary content addressable memory within the Retained Packet Classifier 420. The ternary content addressable memory allows for exact and partial matches between the arriving packet headers and the contents of the content addressable memory. If a full or partial match is found for the specified protocol headers within the content addressable memory, the packet becomes a candidate for data retention. Second, the Retained Packet Classifier 420 can be instructed to perform a hashing function on a programmable number of protocol header fields and then use the result of the hash to determine if the packet is a candidate for retention. Third, the Retained Packet Classifier 420 can be instructed to perform a search within a search tree or trie that is resident in a memory accessible by the Retained Packet Classifier 420 for a programmable number of the packet's protocol header fields; if a exact or partial match is found for the specified protocol headers within the search tree or trie, the packet becomes a candidate for data retention. The Retained Packet Classifier 420 can also be programmed to use the length of the incoming packet to determine its candidacy for retention. For example packets that are shorter than a programmable length may be excluded from being retained, irrespective of whether the packets were identified as candidates for retention through the application of retention criteria that are based on matching of protocol header fields. In general, longer packets that belong to long-lived sessions would be the best candidate for packet retention. However the Retained Packet Classifier block 420 can be programmed in an arbitrary manner to select any packet type for retention. The Retained Packet Classifier 420 can also be programmed to exclude packets that have failed the protocol checks or the firewall rules from being retained in the DRNIC 410, irrespective of whether the packets were identified as candidates for retention through other criteria.

Those skilled in the art having the benefit of this disclosure will appreciate that there are many variations for packet classification and selection that can be used within the Retained Packet Classifier 420 block to identify packets that are candidates for retention, all within the scope of the present invention.

The present invention contains a Retained Data Buffer 422 memory which is used to retain either the full packet data or smaller sub-portions of the packet. Sub-portions of the packet may be constituted of some of the protocol headers and digests plus some or all of Application Payload 79, or may be limited to just some or all of the Application Payload 79. The specific packet data to be retained in the Retained Data Buffer 422, be it the entire packet or arbitrary parts of the packet, is programmable under the control of the user and the software layers within the KSSL 50.

Figure 6:
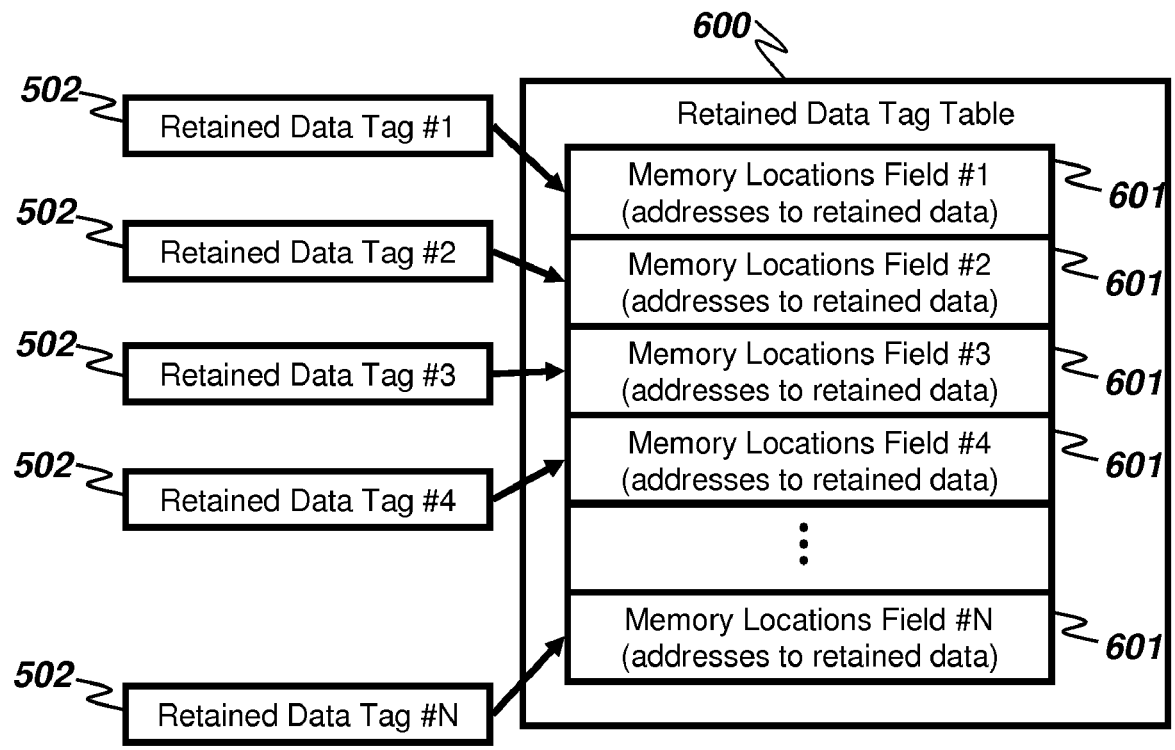
FIG. 6 is a block diagram representation of a Retained Data Tag Table according to some embodiments of the present invention.

The Retained Data Buffer 422 is managed by the Retained Data Buffer Manager block 421 which partitions and manages the content of the Retained Data Buffer 422, as well as provides read and write interfaces to the block. Data from packets that are eligible for retention can only be retained if there is enough space to store that data in the Retained Data Buffer 422. Therefore, prior to making a decision on whether to retain the data of an eligible packet, the Retained Packet Classifier 420 consults the Retained Data Buffer Manager 421 to ensure that there is enough space to store the data within the Retained Data Buffer 422. If there is enough space to store the eligible data in the Retained Data Buffer 422, the Retained Packet Classifier 420 transmits the retained data portion of the packet to the Retained Data Buffer Manager 421 for storage. The Retained Data Buffer Manager 421 writes the retained data into the Retained Data Buffer 422 and generates a unique Retained Data Tag 502. The Retained Data Tag 502 may be a pointer to a memory location within Retained Data Buffer 422 at which the retained data is stored. In other embodiments of this invention, the Retained Data Tag 502 may be an address key to the Retained Data Tag Table 600, a look-up table that stores the address or addresses of locations in the Retained Data Buffer 422 in which the retained data is stored. FIG. 6 depicts an exemplary implementation of the Retained Data Tag Table 600 that stores a plurality of Memory Locations Fields 601 each of which stores the address or addresses of locations in the Retained Data Buffer 422 in which a the retained data for one packet is stored. Those skilled in the art having the benefit of this disclosure will appreciate that there are many variations for creating the look-up table function of the Retained Data Tag Table 600, such as content addressable memories, hash functions, linear memory tables and other variety of look-up tables, some found in prior arts, all within the scope of the present invention. The Retained Data Tag 502 is transmitted to the Retained Packet Classifier 420 and can be used to locate and access the retained data within the Retained Data Buffer 422 at a future point of time.

The Retained Data Buffer Manager 421 stores the retained packet data into the Retained Data Buffer 422. The Retained Data Buffer 422 may be organized in a variety of methods. For example, the Retained Data Buffer 422 may be organized as one or several collections of buffer resources. In one embodiment of the current invention, each collection of buffer resources may be organized as a random-access collection of memory locations that can be written to or read from using a non-deterministic access pattern. In another embodiment of the current invention, each collection of buffer resources within the Retained Data Buffer 422 may be organized as one or several queues. Each of these queues may occupy a continuous space within the Retained Data Buffer 422 memory or may be made up of multiple disparate memory parts that are linked together in a linked list. Similarly, retained data stored in each of these queues within the Retained Data Buffer 422 memory may be stored in sequential manner within a continuous memory space or may be written into multiple disparate memory parts that are linked using a linked list. Moreover, queues within the Retained Data Buffer 422 may be organized into a number of queues that correspond to the queues of the Packet Data Buffer 413 or they may be organized in a manner that is independent of the organization of the Packet Data Buffer 413.

Those skilled in the art having the benefit of this disclosure can devise many other variations for organizing the Retained Data Buffer 422 storage memory, some of them well known in prior art, all within the scope of the present invention.

Figure 7:
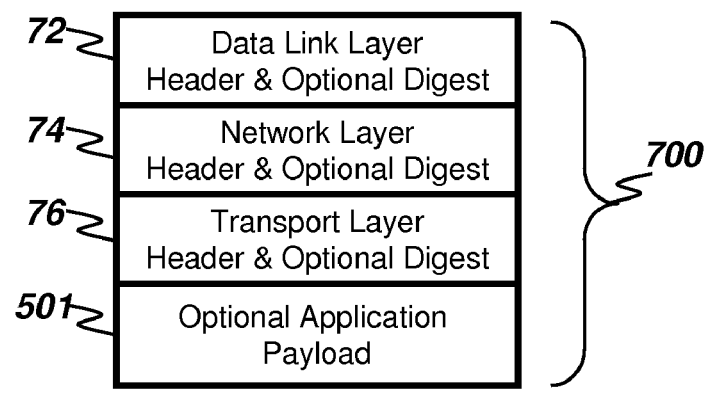
FIG. 7 is a block diagram representation of a Truncated Packet according to some embodiments of the present invention.

In addition to causing retained data to be written into the Retained Data Buffer 422, the Retained Packet Classifier 420 transmits to the Packet Buffer Manager 416 a partial section of the arriving packet whose data is retained within the DRNIC 410. FIG. 7 shows this partial section of the retained packet, which we call the Truncated Packet 700. The contents of the Truncated Packet 700 enable software layers within the KSSL 50 to process the packet information and determine the location(s) within the Computer Memory 20 in which all or some of the retained data will be written. The Truncated Packet 700 is composed of the protocol headers for the data link, network, and transport protocol layers, as well as an optional user specified amount of Optional Application Payload 501 data from the Application Payload 79. Along with the Truncated Packet 700, the Retained Packet Classifier 420 transmits the Retained Data Tag 502 and all information that will eventually be required to populate the Packet/Truncated-Packet Information Area 456 of the DRNIC Buffer Descriptor Data Structure 455 such as the packet header types, packet length, status of packet and protocol headers validation and all other information required by the software layers within the KSSL 50 to process the packet. It is important to note that the original packet can be reconstructed by combining the Truncated Packet 700 and the retained data.

If the Retained Packet Classifier block 420 determines that the packet data is not eligible for retention within the DRNIC 410 it forwards the entire packet and its associated results from the validation, checking and firewall operations to the Packet Buffer Manager 416 block without retaining copies any part of that packet in the Retained Data Buffer 422.

Similarly, if the Retained Packet Classifier block 420 determines that the packet data is eligible for retention within the DRNIC 410 but there is not enough space in the Retained Data Buffer 422 to store the packet's retained data, then it forwards the entire packet and its associated results from the validation, checking and firewall operations to the Packet Buffer Manager 416 block without retaining copies of any part of that packet in the Retained Data Buffer 422.

Full packets and Truncated Packets are stored in the Packet Data Buffer 413 prior to being eventually transferred to the Computer Memory 20. The Packet Data Buffer 413 may function as a single queue that stores and forwards all these incoming packets in a first-in first-out manner. Alternatively the Packet Data Buffer 413 may be subdivided into multiple queues in which arriving packets and truncated packets are inserted based on one or more packet classification criteria as determined by the Packet Classifier 414 block. In the case of the Packet Data Buffer 413 being subdivided into multiple queues, each of these queues forwards their packets or truncated packets in a first-in first-out manner without regard to other queues. In the case of the Packet Data Buffer 413 being subdivided into multiple queues, the Packet Classifier block 414 classifies each arriving packet based on items such as its length, the validity of the different protocol headers, and, the content of the protocol headers for data link, network, transport and upper level protocol layers. This classification is conducted prior to the creation of the Truncated Packets 700 for packets eligible for retention, but its result applies to the corresponding Truncated Packets 700 once they have been generated by the Retained Packet Classifier block 420.

The Packet Buffer Manager 416 block manages the process of writing and reading packets or truncated packets to and from the Packet Data Buffer 413 including monitoring the level of buffer fill and taking appropriate measures, such as selectively discarding or accepting packets or truncated packets destined for the Packet Data Buffer 413 to maintain an appropriate fill level. If the Packet Buffer Manager 416 decides to discard a truncated packet, it commands the Retained Data Buffer Manager block 421 to discard the retained data associated with the discarded packet. In doing so, the Packet Buffer Manager 416 provides the corresponding unique Retained Data Tag 502 to the Retained Data Buffer Manager 421 thus enabling the Retained Data Buffer Manager 421 to locate and delete all of the retained data associated with the discarded truncated packet.

Figure 8:
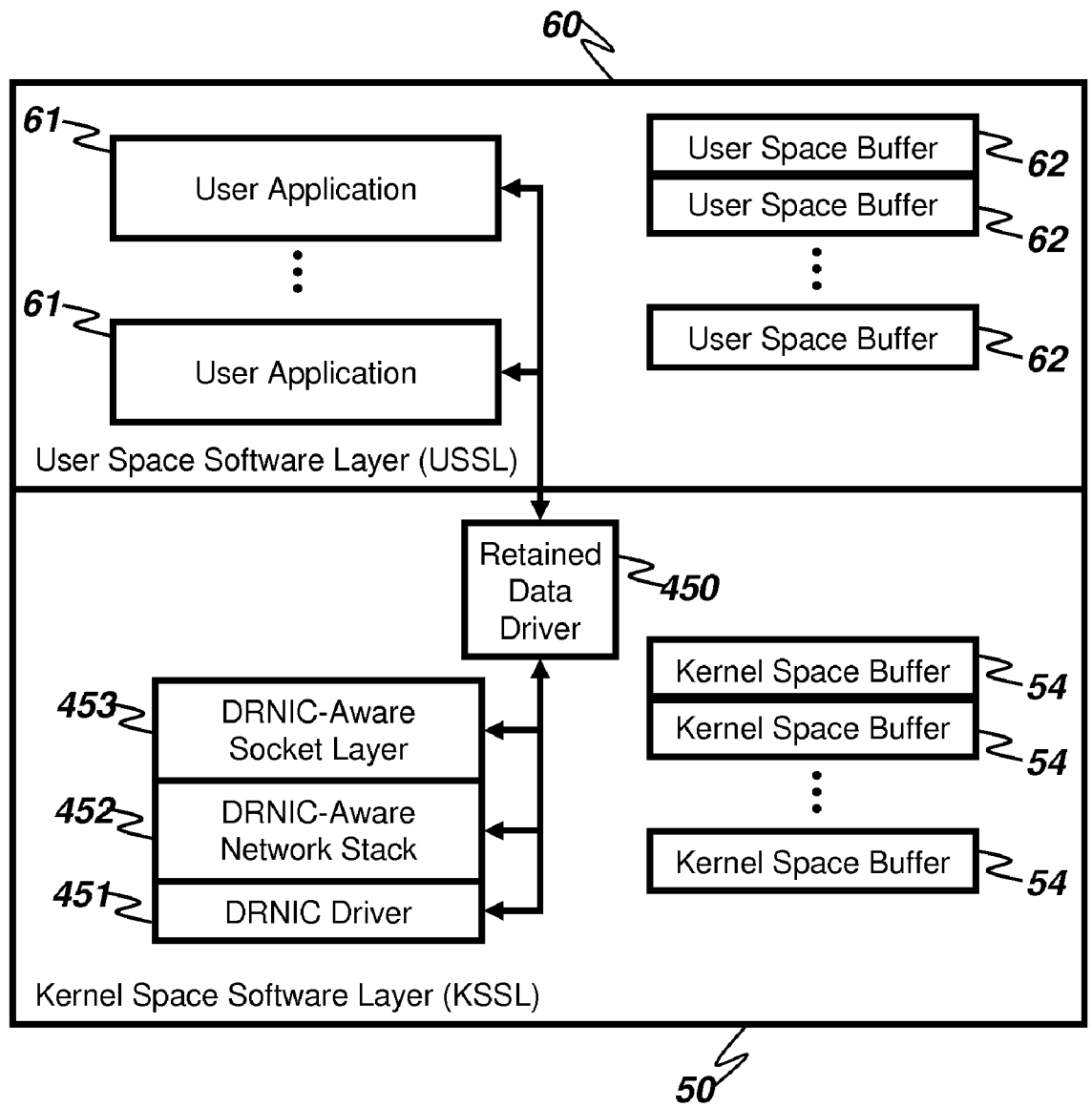
FIG. 8 is a block diagram representation of software layers and data buffers that can process arriving and departing network packets according to some embodiments of the present invention.
Figure 9A:
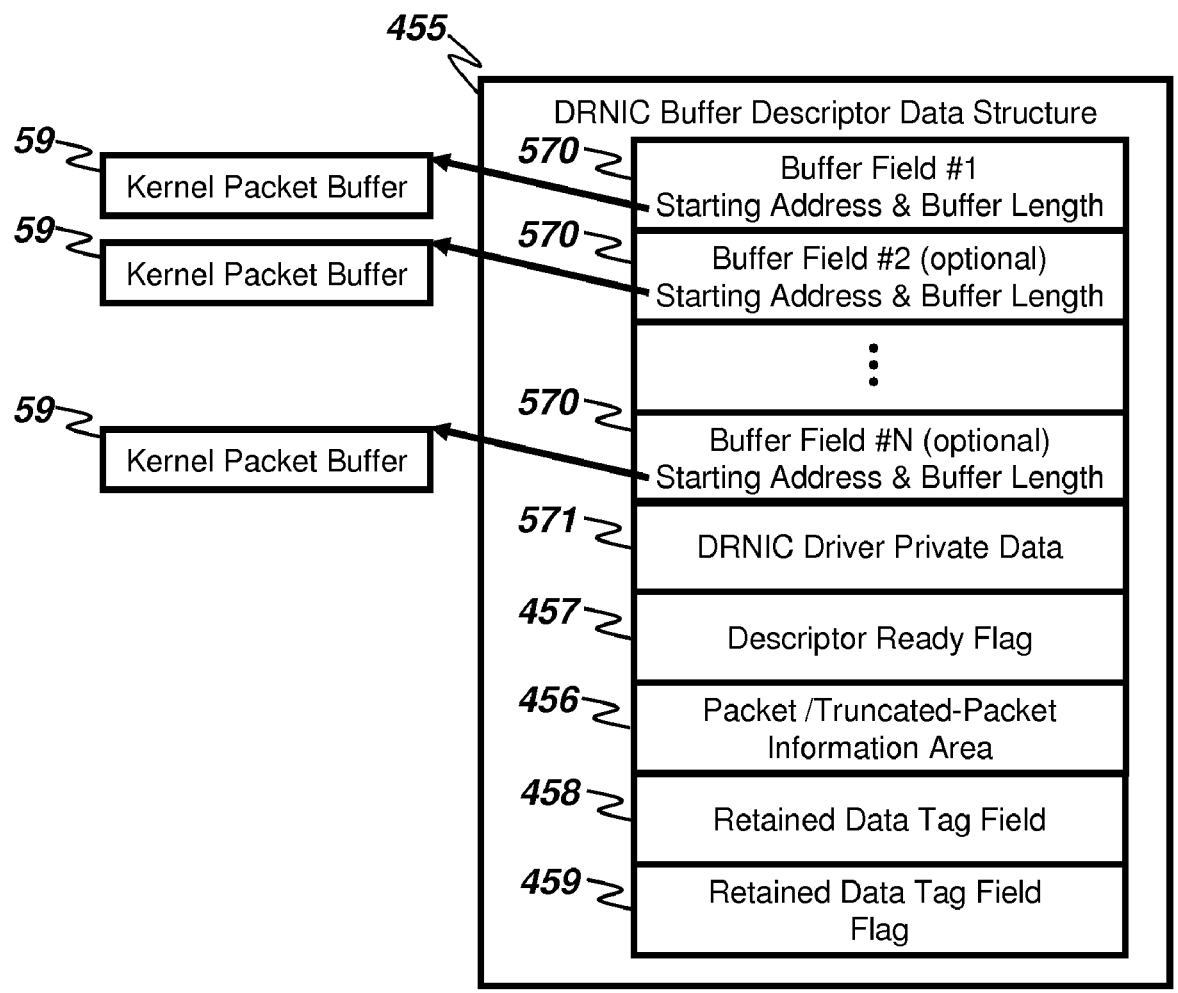
FIG. 9(a) is a block diagram representation of a Data Retaining Network Interface Controller Buffer Descriptor Data Structure that is used to convey information relating to arriving network packets between the Data Retaining Network Interface Controller and the software layers that process the arriving network packets according to some embodiments of the present invention.
Figure 9B:
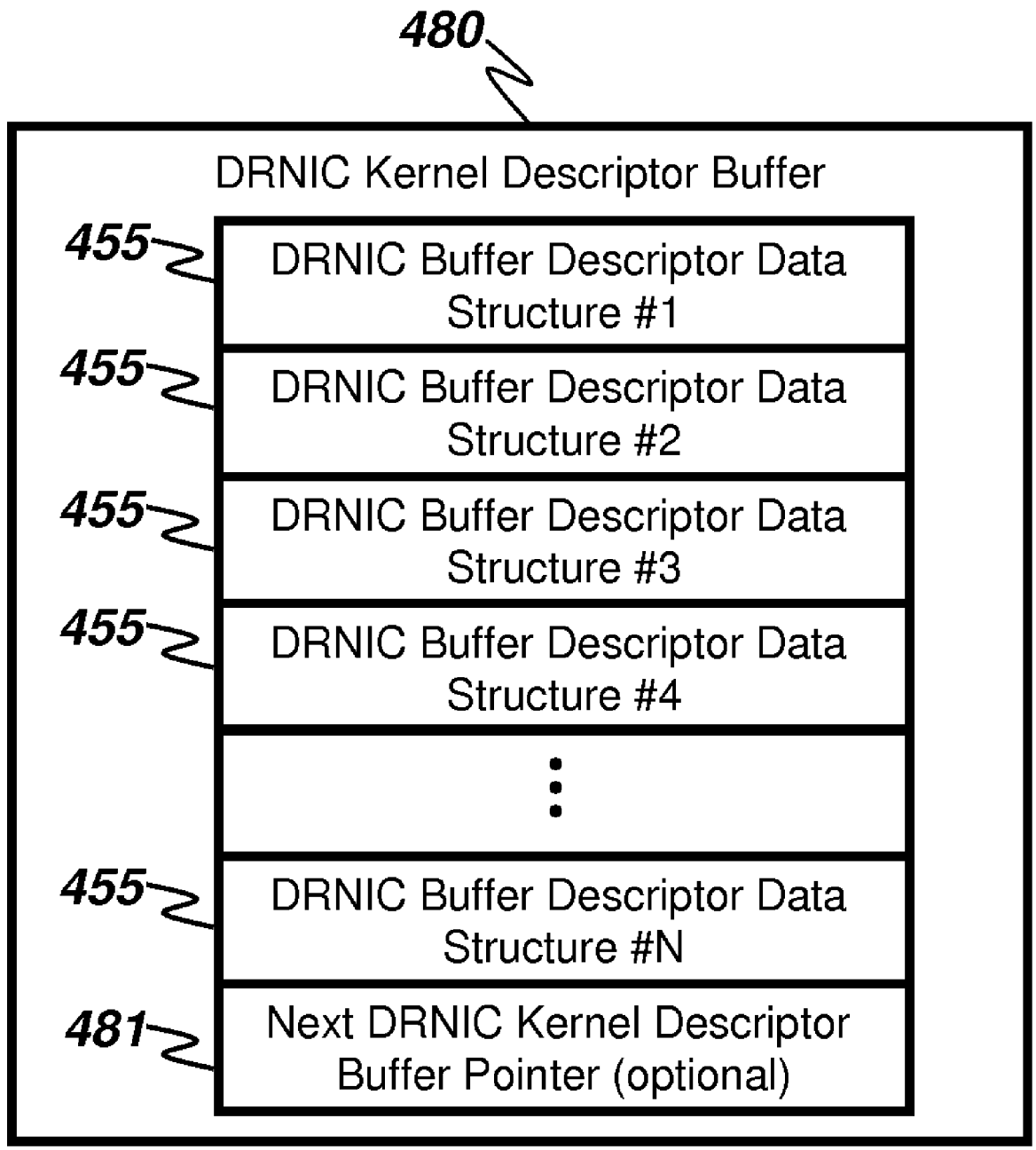
FIG. 9(b) is a block diagram representation of a Data Retaining Network Interface Controller Kernel Descriptor Buffer data structure that is used to convey Data Retaining Network Interface Controller Buffer Descriptor Data Structures between the Data Retaining Network Interface Controller and the software layers that process the arriving network packets according to some embodiments of the present invention.

Packets and truncated packets residing in the Packet Data Buffer 413 are transferred to the Computer Memory 20 through a cooperative effort between the software entities depicted in FIG. 8 and the DRNIC 410. The software entities depicted in FIG. 8 differ from those in FIG. 2 in that they understand the operation of the DRNIC 410 and are able to make use of its data retention functions. The DRNIC-aware software entities that exist in the kernel space software layer 50 of the operating system are the DRNIC Driver 451, DRNIC-Aware Network Stack 452, DRNIC-Aware Socket Layer 453, and the Retained Data Driver 450. The User Application 61 software layers in FIG. 8 may or may not to be aware of the existence of data retention features of the DRNIC 410. Software layers (450, 451, 452, and 453) within the KSSL 50 use the Kernel Space Buffers 54 to transfer arriving packets and truncated packets from the DRNIC 410 to the Computer Memory 20. In the preferred embodiment of this invention, all software layers (450, 451, 452, and 453) within the KSSL 50 are DRNIC-aware. The DRNIC Driver 451 reserves a number of Kernel Space Buffers 54 to which the DRNIC 410 can transfer the contents of the arriving packets and truncated packets from the Packet Data Buffer 413. The Kernel Space Buffers 54 in which the DRNIC 410 writes packets and truncated packets are therefore called Kernel Packet Buffers (KPB) 59. If an arriving packet or truncated packet length is larger than the size of the associate KPB, the packet's contents are divided up into smaller parts and these parts written into multiple KPBs. KPBs may reside in contiguous memory addresses or may be located at disparate locations in the Computer Memory 20. The DRNIC Driver 451 informs the DRNIC 410 of the starting address and length of each KPB through a DRNIC Buffer Descriptor Data Structure 455. FIG. 9(*a*) shows an exemplary organization for a DRNIC Buffer Descriptor Data Structure 455. The DRNIC Driver 451 enters the starting address and length of one KPB 59 into the Buffer Field 570. A DRNIC Buffer Descriptor Data Structure 455 may contain one or more Buffer Fields 570. The DRNIC Driver 451 sets the Descriptor Ready Flag 457 to indicate that the Descriptor is ready for use by the DRNIC 410. The DRNIC Driver 451 stores any private data that the DRNIC Driver 451 may require for future use, such as the virtual addresses of each KPB contained within the DRNIC Buffer Descriptor Data Structure 455, into the DRNIC Drive Private Data 571 field.

Each DRNIC Buffer Descriptor Data Structure 455 contains a Packet/Truncated-Packet Information Area 456 which is left empty by the DRNIC Driver 451. During the course of its operation, the DRNIC 410 fills the Packet/Truncated-Packet Information Area 456 with information specific to the packet associated with the DRNIC Buffer Descriptor Data Structure 455 such as the packet length, truncated-length, packet header types, results of protocol validation, checks and classification, and all other information required by the software layers within the KSSL 50 to process the packet.

The DRNIC Buffer Descriptor Data Structure 455 also contains a Retained Data Tag field 458. If the DRNIC Buffer Descriptor Data Structure 455 is used to convey the information for a truncated packet to the software layers within the KSSL 50, the DRNIC 410 will insert the Retained Data Tag 502 into the Retained Data Tag field 458 and will set the Retained Data Tag Flag 459 field to indicate that this descriptor holds information about a truncated packet and that the content Retained Data Tag Field 458 is valid. For non-truncated packets, the DRNIC will set the Retained Data Tag Flag 459 to indicate that this descriptor holds information about a non-truncated packet and that the Retained Data Tag field 458 is invalid.

The DRNIC Driver 451 conveys multiple DRNIC Buffer Descriptor Data Structures 455 to the DRNIC 410 by writing one or more DRNIC Buffer Descriptor Data Structures 455 into Kernel Space Buffers 54 as depicted in FIG. 9(*b*). Because these Kernel Space Buffers 54 contain DRNIC Buffer Descriptor Data Structures 455, we refer to them herein as DRNIC Kernel Descriptor Buffers (DKDB) 480. DKDBs 480 may reside in contiguous memory addresses or may be located at disparate locations in the Computer Memory 20. If DKDBs 480 reside in contiguous memory addresses the DRNIC Driver 451 provides the address of the first DKDB 480 and the length of the contiguous DKDB space to the Direct Memory Access Engine (DMA Engine) 415 located within the DRNIC 410. If the DKDBs 480 reside in disparate memory addresses, they each must contain an optional pointer 481 that points to the address of the next DKDB 480. In this case, the DRNIC Driver 451 provides the address of the first DKDB to the Direct Memory Access Engine (DMA Engine) 415 located within DRNIC 410. The Direct Memory Access Engine (DMA Engine) 415 then uses the optional pointer 481 to locate the next DKDB. In the case where the DRNIC 410 stores the arriving packets in multiple queues, the DRNIC Driver 451 must provide a unique set of DRNIC Buffer Descriptor Data Structures 455 for each of these queues. Each of these unique sets of DRNIC Buffer Descriptor Data Structures 455 is contained within a distinct set of DKDBs 480.

The availability of the valid DRNIC Buffer Descriptor Data Structures 455 can be conveyed to the DRNIC 410 by many ways that those skilled in the art can appreciate. Exemplary methods to achieve this include having the DRNIC Driver 451 write a message or a fragment of the DKDB 480, or the address of the DKDB 480 to a doorbell register or memory within the DRNIC 410. Alternative exemplary methods to achieve this include having the DRNIC 410 poll the DKDB 480 address, as provided by the DRNIC Driver 451 or deduced by following the optional pointers 481, or a special memory location within the Computer Memory 20 that is used for communication between the DRNIC 410 and the software layers within the KSSL 50.

To transfer arriving packets and truncated packets from the DRNIC 410 to KPBs 59 in the Computer Memory 20, the Direct Memory Access Engine (DMA Engine) 415 uses the available DKDB address provided by the DRNIC Driver 451 for each of the queues within the Packet Data Buffer 413 to read one or more DRNIC Buffer Descriptor Data Structures 455 for each of the Packet Data Buffer 413 queues from the Computer Memory 20. The DMA Engine 415 stores a local copy of each DRNIC Buffer Descriptor Data Structures 455 and modifies the content of this local copy as part of its normal operation. The DMA Engine 415 can only process DRNIC Buffer Descriptor Data Structures 455 with valid Descriptor Ready Flag 457 fields. If a DRNIC Buffer Descriptor Data Structures 455 containing an invalid Descriptor Ready Flag 457 is encountered, the DMA Engine 415 will not process this DRNIC Buffer Descriptor Data Structures 455 until a subsequent time when its Descriptor Ready Flag 457 is found to be in the valid state. For each DRNIC Buffer Descriptor Data Structure 455 with a valid Descriptor Ready Flag 457, the DMA Engine 415 queries the Packet Buffer Manager 416 block to ascertain the availability of packets in the Packet Data Buffer 413. The Buffer Manager block 416 reads each available packet or truncated packet from the Packet Data Buffer 413 and passes it to the DMA Engine 415 which writes the packet or truncated packet into the one or more available KPBs listed in the Buffer Fields 570 of valid DRNIC Buffer Descriptor Data Structures 455 within the Computer Memory 20.

The DMA Engine 415 then modifies the local copy of the DRNIC Buffer Descriptor Data Structures 455 associated with each packet or truncated packet written to the Computer Memory 20, filling in the Packet/Truncated-Packet Information Area 456 with information such as packet length, truncated-packet length, packet header types, results of protocol validation and classification, and all other information required by the software layers within the KSSL 50 to process the packet.

The DMA Engine 415 also modifies the Descriptor Ready Flag 457 to indicate that the DRNIC Buffer Descriptor Data Structure 455 is ready for processing by the DRNIC Driver 451 software layer. If the DRNIC Buffer Descriptor Data Structures 455 holds the information for a truncated packet, the DMA Engine 415 inserts the Retained Data Tag 502 into the Retained Data Tag field 458 and sets the Retained Data Tag Flag field 459 to indicate that this descriptor holds information about a truncated packet and that the content Retained Data Tag field 458 is valid. Otherwise for non-truncated packets, the DMA Engine 415 sets Retained Data Tag Flag 459 to indicate that this descriptor holds information about a non-truncated packet and that the Retained Data Tag field 458 is invalid. Finally, the DMA Engine 415 writes back the modified DRNIC Buffer Descriptor Data Structures 455 into its original location within its DKDB 480 in the Computer Memory 20. Once the one or more modified DRNIC Buffer Descriptor Data Structures 455 are written back, the DRNIC 410 will interrupt the operating system to inform it of the availability of new packets and/or truncated packets in the KPBs 59.

In the case of multiple packet queues within the Packet Data Buffer 413, the DMA Engine 415 and the Packet Buffer Manager 416 arbitrate between all queues within the Packet Data Buffer 413 such that they are all serviced in a fair manner.

As more packets and truncated packets arrive into the Packet Data Buffer 413, the DMA Engine 415 reads the next group of DRNIC Buffer Descriptor Data Structures 455 for each of the Packet Data Buffer 413 queues from the Computer Memory 20. The DMA Engine 415 continues to access successive available packets from the Packet Data Buffer 413 writing them into one or more available KPB in the Computer Memory 20. If the DMA Engine 415 encounters DRNIC Buffer Descriptor Data Structures 455 with invalid Descriptor Ready Flag 457, it continues to poll the DRNIC Buffer Descriptor Data Structures 455 within the Computer Memory 20 by reading the same location of the DRNIC Kernel Descriptor Buffer 480 until it reads a DRNIC Buffer Descriptor Data Structure 455 with a valid Descriptor Ready Flag 457.

The operating system routes the DRNIC's interrupt to the DRNIC Driver 451 software layer. This layer examines the DKDBs 480 for each packet queue and identifies all newly arrived packets/truncated-packets as represented by their DRNIC Buffer Descriptor Data Structures 455 and corresponding KPBs 59. For each received packet/truncated-packet, the DRNIC Driver 415 transfers the corresponding information, such as the Packet/Truncated-Packet Information Area 456, the pointers to the Kernel Packet Buffer(s) 59 that hold the packet/truncated-packet, the Retained Data Tag field 458, and the Retained Data Tag Flag 459 to the DNIC-Aware Network Stack 452. The DNIC-Aware Network Stack 452 software layer is composed of several constituent network protocol sub-stacks. Each sub-stack processes and manages a specific network layer and its corresponding protocol. For example, to process packets carrying Ethernet, IP and TCP protocols as the data link, network and transport protocols, respectively, the DRNIC-Aware Network Stack 452 software layer is made up of intercommunicating sub-stacks where one of the sub-stacks processes the Ethernet protocol, another sub-stack processes the IP protocol and yet another sub-stack processes the TCP protocol. Additional protocol sub-stacks may also be present within the DNIC-Aware Network Stack 452 layer to process additional upper layer protocol headers. For example, an iSCSI sub-stack may be present to further process the incoming packet prior to transferring the payload to the User Application 61.

For non-truncated packets, the DRNIC-Aware Network Stack 452 software layer operates on the packet data present in the Kernel Packet Buffer(s) 59 ensuring that the data is valid and removing protocol overheads (headers and optional digests). In doing so each sub-stack chooses to accept part or all of the remaining packet data. Upon completion of execution of the DRNIC-Aware Network Stack 452 software layer, the DRNIC-Aware Network Stack 452 software layer transfers to the DRNIC-Aware Socket Layer 453 one or more pointers to the valid portions of the Application Payload 79 data that is present in the Kernel Packet Buffer (s) 59 as well as any information required by the DRNIC-Aware Socket Layer 453 to associate the valid portions of the Application Payload 79 to a specific User Application 61 software layer and its User Space Buffer(s) 62. A User Application 61 software layer is not usually allowed to access Kernel Space Buffers 54 and therefore can not access the Application Payload 79 data that reside in the Kernel Packet Buffer(s) 59. The DRNIC-Aware Socket Layer 453 must therefore copy the data from the Kernel Packet Buffer(s) 59 to the User Space Buffer(s) 62 that are associated with the User Application 61. The DRNIC-Aware Socket Layer 453, which executes on the Computer Processor Unit 45, reads the valid portions of the Application Payload 79 data from the Kernel Packet Buffer(s) 59 within the Computer Memory 20 to the Computer Processor Unit 45 and then proceeds to write the same data to the appropriate User Space Buffer 62 which also resides in the Computer Memory 20.

These data moving actions constitute a "copy" operation where data is being copied from one location in the Computer Memory 20 to another different location in the Computer Memory 20. This copy operation is undesirable because it consumes bandwidth resources from the Computer Memory 20, the Computer Interconnect 30 which moves the data between the Computer Memory 20, and the Computer Processor Unit 45. Another undesirable trait of the copy operation is that it also consumes some of the available processing cycles of the Computer Processor Unit 45.

The present invention provides a mechanism for avoiding the copy operation for truncated-packets. For truncated packets, the DRNIC-Aware Network Stack 452 software layer operates on each truncated packet data present in the Kernel Packet Buffer(s) 59. The truncated packet and the associated packet information present in the Packet/Truncated-Packet Information Area 456 of the DRNIC Buffer Descriptor Data Structures 455 contain all protocol headers, results of validation and check operations, and all other data required by the DRNIC-Aware Network Stack 452 software layer to determine the validity of the packet and to identify all valid parts of the Application Payload 79. Each sub-stack in the Network Stack 452 software layer removes its associated protocol header and overhead. Upon completion of execution of the DRNIC-Aware Network Stack 452 software layer, the DRNIC-Aware Network Stack 452 software layer transfers to the DRNIC-Aware Socket Layer 453 one or more pointers to the valid remaining portion of the truncated-packet. This valid portion may contain upper layer protocol headers and may also contain parts of the Application Payload 79 data present in the truncated packet within the Kernel Packet Buffer(s) 59. The Network Stack 452 software layer also provides other information required by the DRNIC-Aware Socket Layer 453 to associate the valid portion of the truncated packet and the corresponding retained data within the DRNIC 410 to a specific User Application 61 software layer and its User Space Buffer(s) 62; examples of such data are packet length and any required protocol header fields contained within the truncated packet. The DRNIC-Aware Network Stack 452 software layer also provides all information required by the DRNIC-Aware Socket Layer 453 to access the retained data within the DRNIC 410 such as the length of the retained data, the offset of the retained data from the various protocol header fields, the value of the Retained Data Tag field 458, and the Retained Data Tag Flag 459.

Upon receiving the truncated packet information from the DRNIC-Aware Network Layer 452, the DRNIC-Aware Socket Layer 543 determines if any valid parts of the Application Payload 79 are present within the Kernel Packet Buffer (s) 59. If valid parts of the Application Payload 79 are present within the Kernel Packet Buffer(s) 59, and if a copy of these parts have not been retained by the DRNIC 410, then the DRNIC-Aware Socket Layer 543 will read these parts of the Application Payload 79 data from truncated packet data that is present in the Kernel Packet Buffer(s) 59 within the Computer Memory 20 to the Computer Processor Unit 45 and then write that same data to the appropriate User Space Buffer 62. If the valid parts of the Application Payload 79 are present within the Kernel Packet Buffer(s) 59 and are also retained in the Retained Data Buffer 422, the DRNIC-Aware Socket Layer 543 may choose to copy these parts from the Kernel Packet Buffer(s) 59 to the User Space Buffer 62 using the Computer Processor Unit 45 or otherwise use the DRNIC 410 functions to write this data directly to the User Space Buffer 62 as described below. For the retained data present in the Retained Data Buffer 422, the DRNIC-Aware Socket Layer 543 determines which parts of the retained data must be moved from the Retained Data Buffer 422 to one or more User Space Buffers 62. The Socket Layer 543 then instructs the DRNIC 410 to write the retained data directly into the appropriate User Space Buffers 62. By writing the retained data directly from the Retained Data Buffer 422 to the Retained Data Buffer 422 the undesirable copy operation is avoided for the retained data portion of the arriving packet.

In the present invention any software layer can instruct the DRNIC 410 to write the retained data from the Retained Data Buffer 422 to the Computer Memory 20. The following description illustrates the operation of the present invention when the write processes is initiated by any "requesting software layer" without precluding embodiments where kernel or user space software layers initiate the write process.

Figure 10A:
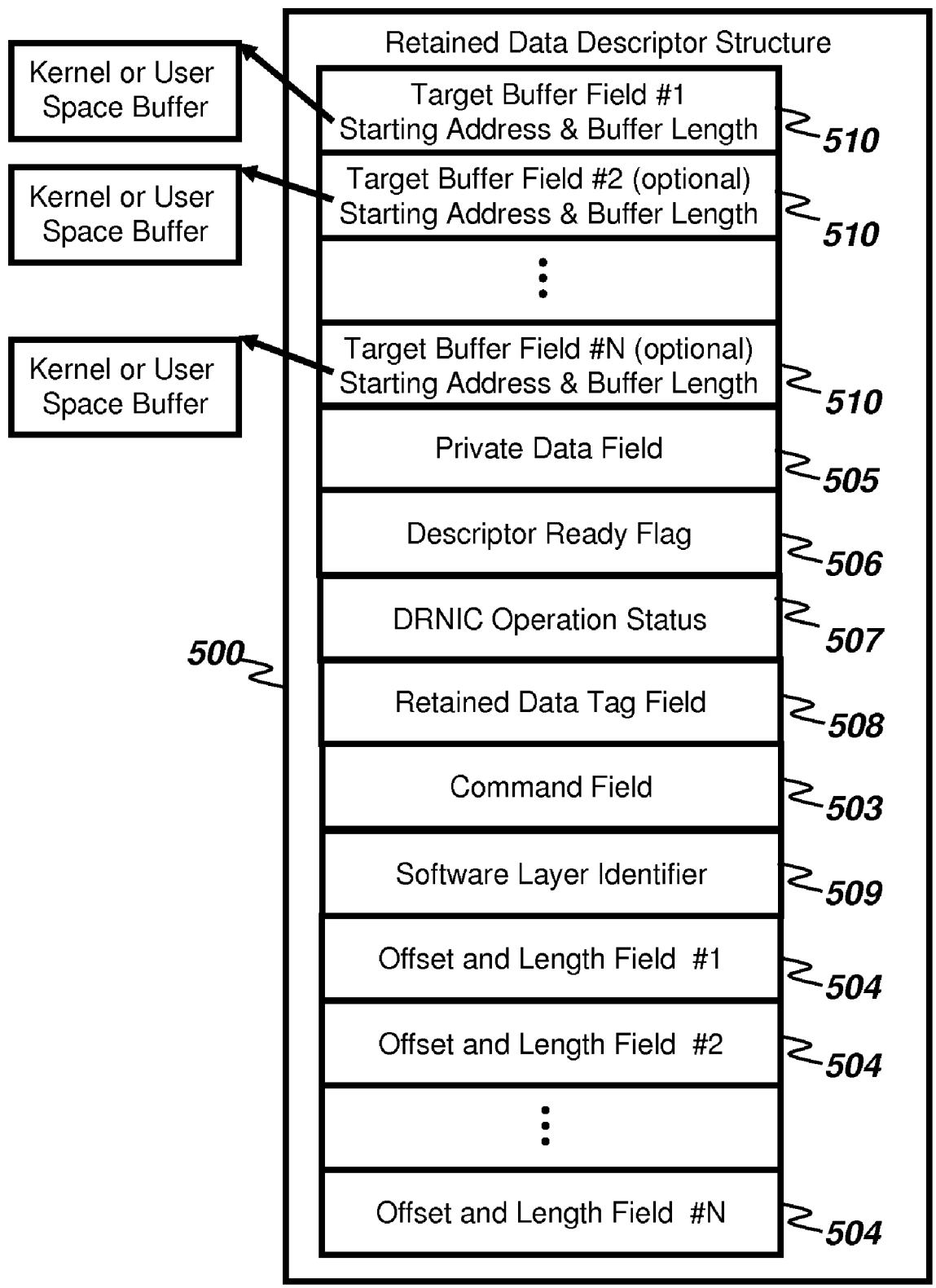
FIG. 10(a) is a block diagram representation of a Retained Data Descriptor Structure that is used to convey information relating to retained packet data between the Data Retaining Network Interface Controller and the software layers that process the arriving network packets according to some embodiments of the present invention.

The DRNIC 410 is instructed to write the valid parts of the retained data into the Computer Memory 20 through the use of one or more Retained Data Descriptor Structure(s) RDDS 500. A block representation of an embodiment of the Retained Data Descriptor Structures 500 is shown in FIG. 10(*a*). The requesting software layer populates the Target Buffer Field(s) 510 of Retained Data Descriptor Structures 500 with one or more pointers to the addresses of one or more Computer Memory 20 buffers in which the DRNIC 410 is instructed to write the retained data. The length of each buffer is also indicated in the Target Buffer Field 510. In the case where the requesting software layer is the DRNIC-aware Socket Layer 543, the Target Buffer Fields 510 will usually contain the addresses of User Space Buffers 62 that are accessible by a User Application 61 software layer. However, any and all software layers within the KSSL 50 may also populate these fields with the addresses of Kernel Space Buffers 54 in the case where one or more kernel space software layer decides to inspect and process the retained data prior to having the data written to User Space Buffers 62. Moreover, user space software layers are not precluded from being a "requesting software layer" that can access the retained data write capabilities of the DRNIC 410. The requesting software layer inserts the Retained Data Tag 502 into the Retained Data Tag Field 508. The Retained Data Tag 502 is used by the DRNIC 410 to locate the retained data within the Retained Data Buffer 422 either directly or through the use of the Retained Data Tag Table 600.

The requesting software layer populates the Command Field 503 with one or more commands for the DRNIC 410. Example commands instruct the DRNIC to write the retained data to the Computer Memory 20, discard the retained data, or write the retained data to the Computer Memory 20 and then discard the retained data. Since not all of the retained data may need to be written to the Computer Memory 20, the Retained Data Descriptor Structures 500 may also contain one or more Offsets and Length Fields 504 that describe the valid fragments of the retained data in terms of an offset from the first byte of the retained data and the length of the valid fragment. The Offsets and Length Fields 504 also indicate the location of the write data in the Computer Memory 20 in terms of offsets from the starting buffer addresses described in the Target Buffer Field(s) 510. The requesting software layer populates the Private Data Field 505 with any data that it may need to use once the write operation is completed including a tag or marker that allows the requesting software layer to re-associate the result of the write operation with a specific packet or network session. The Retained Data Descriptor Structure 500 contains a Software Layer Identifier 509 which is used to route the result of the write operation back to the originating requesting software layer. The Retained Data Descriptor Structure 500 contains a Descriptor Ready Flag 506 which is used to indicate that the Retained Data Descriptor Structure 500 is ready for use by the DRNIC 410. The Retained Data Descriptor Structure 500 also contains a DRNIC Operation Status 507 field that the DRNIC 410 fills out to signal back to the requesting software layer the completion status of the operation once the DRNIC 410 executes the instructions described in the Command Field 503.

Once the requesting software layer populates the appropriate fields of the Retained Data Descriptor Structure 500, it transfers the Retained Data Descriptor Structure 500 to the Retained Data Driver 450. The Retained Data Driver 450 fills in the Software Layer Identifier 509 with a value that is unique to the requesting software layer and then sets the Descriptor Ready Flag 506 to a valid state.

Figure 10B:
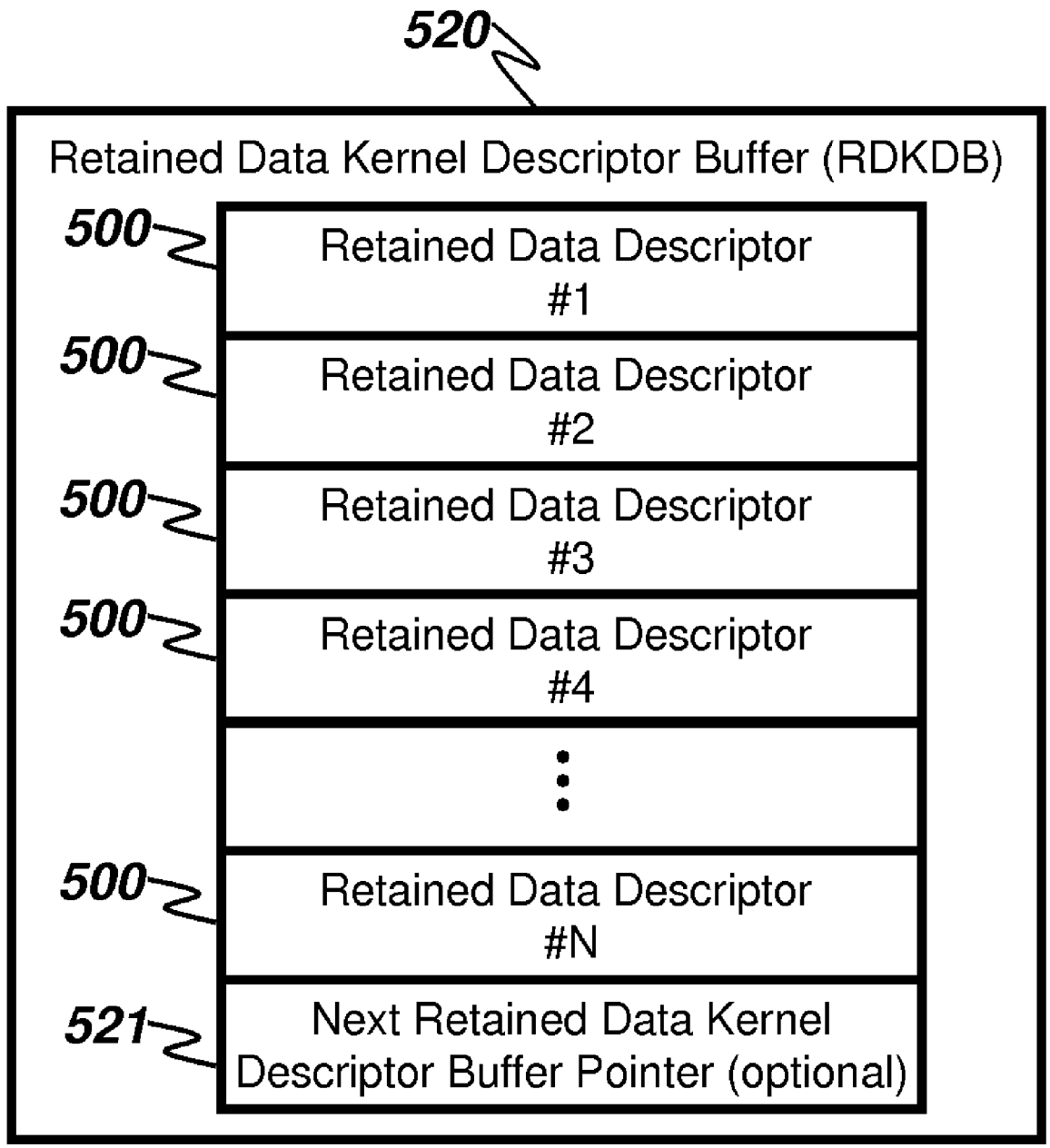
FIG. 10(b) is a block diagram representation of a Retained Data Kernel Descriptor Buffer data structure that is used to convey Retained Data Descriptor Structures between the Data Retaining Network Interface Controller and the software layers that process the arriving network packets according to some embodiments of the present invention.

The Retained Data Driver 450 writes one or more Retained Data Descriptor Structures 500 into one of the Kernel Space Buffers 54 as depicted in FIG. 10(b). Herein, we refer to the Kernel Space Buffers 54 containing one or more Retained Data Descriptor Structures 500 as Retained Data Kernel Descriptor Buffers (RDKDB) 520. The Retained Data Driver 450 may choose to insert all Retained Data Descriptor Structures 500 from all requesting software layers in a single set of RDKDB 520 or it may maintain a unique and separate set of RDKDBs 520 for each requesting software layer. RDKDBs 520 may reside in contiguous memory addresses or may be located at disparate locations in the Computer Memory 20. If RDKDBs 520 reside in contiguous memory addresses, the Retained Data Driver 450 provides the address of the first RDKDB 520 and the length of the contiguous RDKDB space to the Retained Data Write Processor 423 located within the DRNIC 410. If the RDKDBs 520 reside in disparate memory addresses, they each must contain an optional pointer 521 that points to the next RDKDB 520 location. In this case the Retained Data Driver 450 provides the address of the first RDKDB 520 to the Retained Data Write Processor 423 located within DRNIC 410. The Retained Data Write Processor 423 then uses the optional pointer 521 to locate the next RDKDB 520.

In the case where the DRNIC 410 stores the retained data packets in multiple queues within the Retained Data Buffer 422, the Retained Data Driver 450 may provide a different set of Retained Data Descriptor Structures 500 for each of these queues. Each separate set of Retained Data Descriptor Structures 500 would be contained within a distinct set of RDKDBs 520.

The availability of the new Retained Data Descriptor Structures 500 can be conveyed to the DRNIC 410 by many ways that those skilled in the art can appreciate. Exemplary methods to achieve this include having the Retained Data Driver 450 write a message, or a fragment of the RDKDB 520, or the address of the RDKDB to a doorbell register or memory within the DRNIC 410. Alternative exemplary methods to achieve this include having the DRNIC 410 poll the RDKDB 520 address, as provided by the Retained Data Driver 450 or derived by following the optional pointers 521, or a special memory location within the Computer Memory 20 that is used for communication between the DRNIC 410 and the kernel space software layers. Anyone skilled in the art and with the benefit of this disclosure can appreciate that there are many other methods for conveying the information required by the DRNIC 410 to write the retained data to the Computer Memory 20 from the Retained Data Driver 450 including but not limited to different formats for the Retained Data Descriptor Structures 500 and the Retained Data Kernel Descriptor Buffers (RDKDB) 520, all within the scope of this invention.

To transfer the retained data of truncated packets from the Retained Data Buffer 422 of the DRNIC 410 to the Computer Memory 20, the Retained Data Write Processor 423 instructs the Direct Memory Access Engine (DMA Engine) 415 to fetch the first RDKDB 520, or the next RDKDB if the DRNIC 410 is already in operation. Within the local copy of the fetched RDKDB 520, the Retained Data Write Processor 423 searches for the next valid Retained Data Descriptor 500 (one with a valid Descriptor Ready Flag 506). For each valid Retained Data Descriptor 500, the Retained Data Write Processor 423 fetches the retained data that is associated with the Retained Data Tag 502 within the Retained Data Tag Field 508 from the Retained Data Buffer 422. The Retained Data Write Processor 423 then determines the portions of the retained data that the requesting software layer requires to be written into the Computer Memory 20 based on the Offsets and Length Fields 504 of the Retained Data Descriptor 500. The Retained Data Write Processor 423 forwards the valid portion of the retained data to the DMA Engine 415 along with the addresses and lengths of the data buffers to which the retained data is to be written within the Computer Memory 20, the addresses and lengths of these data buffers are the ones listed in the Target Buffer Fields 510 of the Retained Data Descriptor 500. The DMA Engine 415 writes the valid portions of the retained data into the data buffers specified in the Target Buffer Fields 510 and reports back to the Retained Data Write Processor 423 when the write operation has completed, indicating the status of completion (success or failure). The Retained Data Write Processor 423 fills in the DRNIC Operation Status field 507, within the local copy of the Retained Data Descriptor 500, indicating the success or failure of the write operation. The failure of the operation may be the result of several possible scenarios such as data corruption within the Retained Data Buffer 422, invalid Retained Data Tag 502, error within the computer interconnect subsystem 30, or other causes. The Retained Data Write Processor 423 may insert a description of the source of error within the DRNIC Operation Status field 507 or may indicate a simple success or failure status. The Retained Data Write Processor 423 then modifies the Descriptor Ready Flag 506, within the local copy of the Retained Data Descriptor 500, to indicate that the Retained Data Descriptor 500 is ready for further processing by the requesting software layer. Finally, the Retained Data Write Processor 423 instructs the DMA Engine 415 to write back the modified local version of the Retained Data Descriptor 500 data structure(s) into its original location within its Retained Data Kernel Descriptor Buffers (RDKDB) 520.

As long as there remains retained data within the Retained Data Buffer 422, the Retained Data Write Processor 423 continues to read the next group of Retained Data Descriptor Structures 500 for each of the collections of buffer resources within the Retained Data Buffer 422 from the Computer Memory 20. The Retained Data Write Processor 423 continues to access successive available data from the Retained Data Buffer 422 and ensures that they are written into the appropriate locations in the Computer Memory 20. If the Retained Data Write Processor 423 encounters a Retained Data Descriptor 500 with an invalid Descriptor Ready Flag 506, it continues to poll the Retained Data Kernel Descriptor Buffers (RDKDB) 520 by reading the same location of the RDKDB 520 until it reads a Retained Data Descriptor 500 with a valid Descriptor Ready Flag 506.

In the case of multiple collections of buffer resources within the Retained Data Buffer 422, the Retained Data Write Processor 423 arbitrates between all collections of buffer resources within the Retained Data Buffer 422 such that they all serviced in a fair manner.

The DMA Engine 415 is responsible for writing data into the Computer Memory 20 from both the Retained Data Buffer 422 and the Packet Data Buffer 413. The DMA Engine 415 arbitrates between both sources of data ensuring that they both have fair access to the Computer Interconnect 30 and Computer Memory 20 resources. Anyone skilled in the art and with the benefit of this disclosure can appreciate that there are many methods for arbitrating between these two sources of data within the scope of this invention. Exemplary methods for arbitration include but are not limited to one or more of the following schemes: round-robin, weighted round-robin, weighted fair queue and its derivatives, as well as giving strict priority to one data source over the other be it in a consistent manner or for limited durations under specific conditions.

Once one or more modified Retained Data Descriptor Structure(s) 500 are written back to the Computer Memory 20, the DRNIC 410 will interrupt the software layers within the KSSL 50 to inform them of the availability of new retained data packets in the Computer Memory 20. The operating system routes the DRNIC's interrupt to the Retained Data Driver 450. The Retained Data Driver 450 uses the Software Layer Identifier 509 field of each Retained Data Descriptor Structure 500 to route the modified Retained Data Descriptor Structure 500 to the requesting software layer that originally issued the Retained Data Descriptor Structure 500. The Retained Data Driver 450 may choose to signal the completion of each write operation separately or may signal multiple completions with one transaction.

The requesting software layer uses the Private Data Field 505 and/or the Retained Data Tag Field 508 of the Retained Data Descriptor Structure 500 to retrieve all information pertinent to the write operation from the internal data structures of the requesting software layer. The behavior of each requesting software layer in response to a completion of a retained data write will depend on the function of the software layer. While the preferred embodiment of the current invention utilizes DRNIC-aware Network Stack 452 and DRNIC-aware Socket Layer 453 software layers to maximize the benefits of this invention, other embodiments of this invention may contain a prior-art Socket Layer 53 instead of a DRNIC-aware Socket Layer 453 software layer. Yet other embodiments of the present invention may contain prior-art Network Stack 52 and Socket Layer 53 software layers instead of DRNIC-aware Network Stack 452 and DRNIC-aware Socket Layer 453 software layers.

The DRNIC-aware Socket Layer 453, when acting as the requesting software layer, responds to a successful retained data write operation into User Space Buffers 62 by notifying the User Application 61 of the availability of this new data. In the case of an unsuccessful retained data write operation, the DRNIC-aware Socket Layer 453 may respond by either requesting a re-transmission of data from the sending computer, through the operation of the transport protocol, or it may terminate the session and notify the User Application 61 and underlying software layers within the KSSL 50.

The DRNIC-aware Network Stack layer 452, when acting as the requesting software layer, responds to a successful retained data write operation into Kernel Space Buffers 54 by processing the appropriate packet data and notifying the DRNIC-Aware Socket Layer 453, or the Socket Layer 53, of the availability of this new data. In the case of an unsuccessful retained data write operation, the DRNIC-aware Network Stack 452 may respond by either requesting a re-transmission of data from the sending computer, using the transport protocol, or by terminating the session and notifying the all appropriate software layers of this termination.

The DRNIC Driver 451, when acting as the requesting software layer, responds to a successful retained data write into Kernel Space Buffers 54 by processing the appropriate packet data and notifying the DRNIC-Aware Network Stack 452, or the Network Stack 52, of the availability of this new data. In the case of an unsuccessful retained data write operation, the DRNIC Driver 451 may respond by re-attempting the write operation once or multiple times. The DRNIC Driver 451 may also respond to errors by notifying the transport protocol software layer which can request a re-transmission of data from the sending computer.

Each set of retained data described by Retained Data Tag 502 remains in the Retained Data Buffer 422 until a Retained Data Descriptor Structure 500 is issued targeting the retained data set with command to discard the retained data, or write the retained data to the Computer Memory 20 and then discard the retained data, in the Command Field 503. In general, the requesting software layer that issues the last Retained Data Descriptor Structure 500 for a set of retained data will issue a discard command to the DRNIC 410. Some software implementations may choose not to use some or all retained data under different circumstances and may instead instruct the DRNIC 410 to discard the retained data without ever writing it to the Computer Memory 20.

The present invention allows for the retained data to be written into the Computer Memory 20 multiple times. This allows the requesting software layers to broadcast the retained data to multiple memory locations using a separate Retained Data Descriptor Structure 500 for each write operation. In the case of writing the retained data to multiple memory locations, the last Retained Data Descriptor Structure 500 targeting the retained data must contain a discard command to allow the DRNIC 410 to remove the retained data from the Retained Data Buffer 422. To ensure that no retained data is orphaned within the Retained Data Buffer 422 some embodiments of this present invention may include a Retained Data Watchdog Timer 424 function which monitors the period during which each set of retained data resides in the Retained Data Buffer 422. If a given set of retained data is present in the Retained Data Buffer 422 for duration longer than a user programmable limit, the Retained Data Watchdog Timer 424 instructs the Retained Data Write Processor 423 to remove the retained data and the corresponding Retained Data Tag 502 from its data structures. In one embodiment of the present invention the removed retained data is discarded by the DRNIC 410 functions. In another embodiment of the present invention, the retained data represents a full packet which is transferred from the Retained Data Buffer 422 to the Packet Data buffer 413 and subsequently transferred to the Computer Memory 20 for processing by the KSSL 50 software layers. The Retained Data Watchdog Timer 424 function may be implemented within the DRNIC 410 or as part of one of the software layers within the KSSL 50.

It is important to note that the operation of the DRNIC 410 guarantees that packets are delivered to the destination User Application 61 software layer in the order they arrived form the physical receive network link 1. The in-order delivery is guaranteed by the cooperation of the DRNIC 410 and the software layers within the KSSL 50. When the DRNIC 410 retains some or all of the packet data, it inserts a corresponding truncated version of the packet into the Packet Data Buffer 413 in the exact place of the packet whose data is retained within the DRNIC 410. The DRNIC-Aware software layers within the KSSL 50 are, therefore, able to process the truncated version of the packet in place of the full packet and maintain the in-order session context as if these software layers had processed the non-truncated version of the truncated packet.

The DRNIC-Aware Socket Layer 452 ensures that the DRNIC 410 inserts the retained data within the correct User Space Buffers 62. In the case when a truncated packet for a session is followed by a non-truncated packet for the same session, the DRNIC-Aware Socket Layer 452 may copy the Application Payload 79 of the later non-truncated packet to User Space Buffers 62 while the DRNIC 410 is writing the retained data portion of the Application Payload 79 of the truncated packet into the same set of User Space Buffers 62. However even if the DRNIC-Aware Socket Layer 452 completes its task of copying the non-truncated packet's data into the User Space Buffers 62 before the DRNIC 410 completes its task, the DRNIC-Aware Socket Layer 452 waits until the DRNIC 410 completes its write operation before notifying the User Application 61 of the new data. This guarantees that the User Application 61 does not see any out-of-order delivery of its Application Payloads 79.

Naturally, the size of the Retained Data Buffer 422 influences the degree of savings in the bandwidth usage for the Computer Memory 20 when using the present invention. A large Retained Data Buffer 422 will retain data from a larger number of packets and reduce the probability that data from a packet that is classified as eligible for data retention will not be retained due to a lack of memory resources in the Retained Data Buffer 422. Nevertheless, even if this case is encountered, the DRNIC 410 continues to function properly by storing the full packet into the Packet Data Buffer 413. To increase the amount of retained data that can be stored within the DRNIC 410 the Retained Data Buffer 422 can be implemented as a Static RAM (SRAM) or Dynamic RAM (DRAM) memory embedded within an integrated circuit chip, or as an independent dedicated Static RAM (SRAM) or Dynamic RAM (DRAM) memory, be it as a single integrated circuit chip or a group of integrated circuit chips, or as a combination of embedded and independent memory implementations.

With the benefit of this disclosure, those skilled in the art will appreciate that there are multiple embodiments of this invention yielding different amount of savings in the number of accesses to the Computer Memory 20. The following are examples of different embodiments that are all within the scope of the present invention.

In one embodiment of this invention described above, the DRNIC 410 writes a truncated packet into Kernel Packet Buffers 59 and retains some or all of the packet data in its Retained Data Buffer 422. The software layers within the KSSL 50 process the truncated packets and determine the location of the User Space Buffer(s) 62 in which the retained parts of the Application Payload 79 are to be written. The software layers within the KSSL 50 instruct the DRNIC 410 to write parts or all of the retained packet data directly into User Space Buffers 62 that are accessible by a User Application 61 software layer. In this case, the operation of the Retained Data Write Processor 423 and the DMA Engine 415, both described above, move the retained data to its final destination, the User Space Buffers 62, without having to write the data first into Kernels Space Buffers 54. This manner of operation reduces the number of accesses to the Computer Memory 20 from three to one for the retained data.

In another embodiment of this invention, the DRNIC 410 writes the complete packet into Kernel Packet Buffers 59 and also retains some or all of the packet data in its Retained Data Buffer 422. The software layers within the KSSL 50 process the packet protocol headers contained within the Kernel Packet Buffers 59 and determine the location of the User Space Buffer(s) 62 in which the Application Payload 79 is to be written. The software layers within the KSSL 50 then instruct the DRNIC 410 to write parts or all of the retained packet data directly into the User Space Buffers 62 that are accessible by a User Application 61 software layer. In this case, the operation of the Retained Data Write Processor 423 and the DMA Engine 415 move the retained data to its final destination, the User Space Buffers 62, without having the Computer Processor Unit 45 read the entire Application Payload 79 from the Computer Memory 20. This manner of operation reduces the number of accesses to the Computer Memory 20 because it eliminates the need for reading the Application Payload 79 from the Kernel Packet Buffers 59 in the Computer Memory 20 in order to write the Application Payload 79 into the User Space Buffers 62.

In yet another embodiment of this invention, the DRNIC 410 writes the complete or truncated packet into Kernel Packet Buffers 59 and also retains some or all of the packet data in its Retained Data Buffer 422. The software layers within the KSSL 50 process the packet or truncated packet protocol headers contained within the Kernel Packet Buffers 59 and determine that the packet needs to be replicated into one or more User Space Buffer(s) 62 or Kernel Packet Buffer (s) 59. The software layers within the KSSL 50 then instruct the DRNIC 410 to write parts or all of the retained packet data directly into User Space Buffer(s) 62 or Kernel Packet Buffer (s) 59 without having to read the entire packet from the Computer Memory 20 to the Computer Processor Unit 45.

In yet another embodiment of this invention, the DRNIC 410 writes the truncated packet into Kernel Packet Buffers 59 and also retains some or all of the packet data in its Retained Data Buffer 422. The DRNIC Driver 451 processes the packet protocol headers contained within the Kernel Packet Buffers 59 and determines that the packet needs to be presented in full to the upper layers of the Kernel Space Software layer 50. The DRNIC Driver 451 then instructs the DRNIC 410 to write all parts of the packet that are present in the Retained Data Buffer 422 but not present in the Kernel Packet Buffers 59 to the Kernel Packet Buffers 59 such that the Kernel Packet Buffers 59 contain the full packet for processing by the upper layers of the Kernel Space Software layer 50. In this embodiment, the operation of the DRNIC 410 and NIC 10 would be indistinguishable for kernel space software layers above the DRNIC Driver 451.

In yet another embodiment of this invention, the DRNIC 410 is instructed by the software layers within the KSSL 50 to classify all arriving packets as ineligible for data retention. In this embodiment, the DRNIC 410 always writes the full packets into Kernel Packet Buffers 59. In this embodiment, the operation of the DRNIC 410 and NIC 10 would be undistinguishable for all software layers within the KSSL 50.

With the benefit of this disclosure, those skilled in the art will appreciate that there are multiple methods for distributing the above described functions of the present invention into different organizational blocks, be it to separate certain functions from each other or combine different functions into one block, all within the scope of the present invention. Moreover, the functions of the invention may be repartitioned across different integrated circuits and may be implemented as hardware or software, all within the scope of the present invention. Software functions described herein may reside in software layers within the KSSL 50, USSL 60, or embedded software layers that are not part of the operating system, all within the scope of the present invention.

It is expected that in actual implementations, there would be additional components not illustrated herein but commonly used to achieve the functions of receiving and transmitting network packets.

References in the specification to "an embodiment", "one embodiment", "some embodiment", "another embodiment", or "other embodiments" means that the particular feature, structure or characteristic described in connection with the embodiments is included in at least some embodiments but not necessarily all embodiments, of the invention. The various appearances "an embodiment", "one embodiment", "some embodiment", "another embodiment", or "other embodiments" are not necessarily referring to the same embodiment.

If the specification states a component, feature, structure or characteristic "may", "might" or "could" be included, that particular component, feature, structure or characteristic is not required to be included. If the specification or claims refers to "a" or "an" element that does not mean that there is only one of the elements. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly it is the following claims including any amendments thereto that define the scope of the invention.

What is claimed is:

1. A method for receiving a plurality of packets from a network into a computer system, the computer system having a memory, a plurality of protocol stack layers and at least one network interface controller (NIC), the computer system being coupled to the network, the method comprising the following steps, in any order:

(a) creating a first plurality of descriptor data structures residing in the memory of said computer system, each descriptor data structure in the first plurality of descriptor data structures comprising a plurality of information entries of which at least one information entry comprises at least one address of a memory destination in the memory of the computer system and the corresponding length of said memory destination;

(b) reading, by the NIC of a first descriptor data structure from the first plurality of descriptor data structures, said first descriptor data structure being located in a first destination of the memory of the computer system and comprising a plurality of information entries of which at least one information entry comprises at least one address of a second destination in the memory of the computer system and the corresponding length of the second destination;

(c) receiving, by the NIC, on said computer system from said network, of a packet, said packet comprising a payload data and a plurality of headers and digests corresponding to said plurality of protocol stack layers, said payload data intended for placement in the memory of said computer system according to processing by said protocol stack layers of said headers and digests;

(d) processing, by the NIC, of at least one of the plurality of headers and digests of the packet corresponding to said plurality of protocol stack layers, including creating a summary of said processed headers and digests;

(e) choosing, by the NIC, dependent upon said summary, to write the packet to the second destination in the memory of said computer system, the address of the second destination being specified within the first descriptor data structure;

(f) choosing, by the NIC, dependent upon said summary, to copy the packet as a retained data into a retained data buffer within said computer system, said retained data comprising said packet, the retained data buffer comprising at least one queue;

(g) generating, by the NIC, of a retained data tag, corresponding to said retained data, that can be used for future retrieval of the retained data from the retained data buffer;

(h) inserting, by the NIC, into the first descriptor data structure at the first destination in the memory of the computer system information comprising said summary of processed headers and digests of said packet, a descriptor ready flag, a packet information area field, the retained data tag, and a retained data tag field flag;

(i) processing the first descriptor data structure stored in the first destination and the packet stored in the second destination of the memory by said plurality of protocol stack layers including creation of a summary of commands;

(j) choosing, dependent upon said summary of commands to copy data from the second destination in the memory of said computer system to a third destination in the memory of said computer system;

(k) creating a second plurality of descriptor data structures residing in the memory of said computer system, each descriptor data structure in the second plurality of data structures comprising a plurality of information entries of which at least one information entry comprises at least one address of a memory destination in the memory of the computer system and the corresponding length of said memory destination and of which another information entry can hold the retained data tag for the retained data;

(l) choosing, dependent upon said summary of commands, to populate a second descriptor data structure from the second plurality of data structures, said second descriptor data structure located at a fourth destination in the computer system memory and comprising a plurality of information entries of which at least one information entry comprises at least one address of a fifth destination in the memory and the corresponding length of the fifth destination and of which another information entry comprises the retained data tag for the retained data;

(m) choosing, by the NIC, dependent upon said summary of commands and content of the second descriptor data structure, to copy the retained data from the retained data buffer to the fifth destination in the memory of said computer system; and (n) inserting, by the NIC, upon completion of copying the retained data from the retained data buffer to the fifth destination in the memory of said computer system, into the second descriptor data structure at the fourth destination in the memory information comprising a descriptor ready flag and an operation completion status field.

2. The method of claim 1, wherein the NIC chooses to write a truncated packet into the second destination in the memory of said computer system instead of the entire content of the packet.

3. The method of claim 1, wherein the retained data that is stored in the retained data buffer as a subset of said packet instead of the complete packet.

4. The method of claim 1, wherein the NIC contains a DMA engine and said copying of the packet to the second destination is performed by the DMA engine.

5. The method of claim 1, wherein the NIC contains a DMA engine and said copying of the retained data from the retained data buffer to the fifth destination is performed by the DMA engine.

6. The method of claim 1, wherein the NIC contains a DMA engine and said inserting of information by the NIC into the first descriptor data structure and into the second descriptor data structure is performed by the DMA engine.

7. The method of claim 1, wherein each of the descriptor data structures within the first plurality of descriptor data structures residing in the memory is a DRNIC buffer descriptor data structure.

8. The method of claim 1, wherein the first plurality of descriptor data structures residing in the memory of the computer system is a DRNIC kernel descriptor buffer.

9. The method of claim 1, wherein each of the descriptor data structures within the second plurality of descriptor data structures residing in the memory is a retained data descriptor structure.

10. The method of claim 1, wherein the second plurality of descriptor data structures residing in the memory of the computer system is a retained data kernel descriptor buffer.

11. The method of claim 1, further comprising choosing to retain data from the packet in the retained data buffer using a retained packet classifier to match said protocol headers to a set of selection criteria.

12. The method of claim 11, further comprising selecting of the queue within the retained data buffer in which the retained data of the packet is retained, using the retained packet classifier.

13. The method of claim 1, further comprising choosing to retain data from the packet in the retained data buffer by matching the length of the packet to a set of selection criteria.

14. The method of claim 1, further comprising choosing the packet for retention in the retained data buffer based on the fill level of the retained data buffer.

15. The method of claim 1, further comprising maintaining a retained data tag table and storing the retained data tag in the retained data tag table.

16. The method of claim 1, further comprising copying the retained data to multiple destinations in the memory of the said computer system.

17. The method of claim 1, further comprising discarding the retained data of said packet from the retained data buffer based on the content of one of the plurality of entries in the second descriptor data structure.

18. The method of claim 1, further comprising discarding the retained data from the retained data buffer if said retained data is not copied from the retained data buffer to the memory of said computer system within a time period specified by a retained data watchdog timer.

19. The method of claim 1, wherein the third destination in the memory of said computer system and the fifth destination in the memory of the computer system are the same physical destination in the memory of the computer system.

20. A method for receiving a plurality of packets from a network into a computer system, the computer system having a memory, a plurality of protocol stack layers, a plurality of software layers, and at least one network interface controller (NIC), each of said packets having a payload data and a plurality of headers and digests each corresponding to said plurality of protocol stack layers, the computer system being coupled to the network, the method comprising the following steps, in any order:

(a) creating a first plurality of descriptor data structures residing in the memory of said computer system, each descriptor data structures in the first plurality of descriptor data structures comprising a plurality of information entries of which at least one information entry comprises at least one address of a memory destination in the memory of the computer system and the corresponding length of said memory destination;

(b) notifying the NIC of the availability of a first descriptor data structure from the first plurality of descriptor data structures, said first descriptor data structure being located in a first destination of the memory of the computer system and comprising a plurality of information entries of which at least one information entry comprises at least one address of a second destination in the memory of the computer system and the corresponding length of the second destination;

(c) receiving, by the NIC, of a packet comprising a payload data and a plurality of headers and digests each corresponding to said plurality of protocol stack layers;

(d) processing, by the NIC, of at least one of the plurality of headers and digests of the packet corresponding to said plurality of protocol stack layers, including creating a summary of said processed headers and digests;

(e) choosing, by the NIC, dependent upon said summary, to copy the packet as a retained data into a retained data buffer within said computer system, said retained data comprising said packet, the retained data buffer comprising at least one queue;

(f) generating, by the NIC, of a retained data tag, corresponding to said retained data, that can be used for future retrieval of the retained data from the retained data buffer;

(g) waiting for the NIC to write the packet in the second destination of the memory of the computer system, the address of the second destination being specified within the first descriptor data structure;

(h) waiting for the NIC to insert into the first descriptor data structure at the first destination in the memory of the computer system information comprising of said summary of processed headers and digests of said packet, a descriptor ready flag, a packet information area field, the retained data tag, and a retained data tag field flag;

(i) processing the first descriptor data structure stored in the first destination and the packet stored in the second destination of the memory by said plurality of protocol stack layers including creation of a summary of commands;

(j) choosing, dependent upon said summary of commands, to copy data from the second destination in the memory of said computer system to a third destination in the memory of said computer system;

(k) choosing, dependent upon said summary of commands, to notify at least one of said plurality of software layers of availability of data from the packet in the third destination of the memory of the computer system;

(l) creating of a second plurality of descriptor data structures residing in the memory of said computer system, each descriptor data structure in the second plurality of data structures comprising a plurality of information entries of which at least one information entry comprises at least one address of a memory destination in the memory of the computer system and the corresponding length of said memory destination, and of which one information entry can hold the retained data tag for the retained data;

(m) choosing, dependent upon said summary of commands, to populate a second descriptor data structure from the second plurality of data structures, said second descriptor data structure located at a fourth destination in the computer system memory and comprising a plurality of information entries of which at least one information entry comprises at least one address of a fifth destination in the memory and the corresponding length of the fifth destination, and of which one information entry comprises the retained data tag for the retained data;

(n) choosing to notify the NIC of the availability of the second descriptor data structure in the fourth destination of the memory;

(o) choosing, by the NIC, dependent upon said summary of commands and content of the second descriptor data structure, to copy the retained data from the retained data buffer to the fifth destination in the memory of said computer system;

(p) inserting, by the NIC, upon completion of copying the retained data from the retained data buffer to the fifth destination in the memory of said computer system, into the second descriptor data structure at the fourth destination in the memory information comprising a descriptor ready flag and an operation completion status field;

(q) waiting for the NIC to insert into the second descriptor data structure at the fourth destination in the memory of the computer system information comprising of said descriptor ready flag and said completion status field;

(r) choosing, dependent upon said completion status field, to notify at least one of said plurality of protocol stack layers of availability of data from the packet in the fifth destination of the memory of the computer system; and (s) choosing, dependent upon said completion status field, to notify at least one of said plurality of software layers of availability of data from the packet in the fifth destination of the memory of the computer system.

21. The method of claim 20, further comprising waiting for the NIC to write a truncated packet in the second destination of the memory of the computer system.

22. The method of claim 20, further comprising waiting for waiting for the NIC to write some but not all of the retained data in the fifth destination of the memory of the computer system.

23. An apparatus for receiving a plurality of packets from a network into a computer system, the computer system having a memory, a computer interconnect network, a plurality of protocol stack layers and at least one network interface controller (NIC), the computer system being coupled to the network, each of the said packets having a payload data and a plurality of headers and digests corresponding to said plurality of protocol stack layers, said payload data intended for placement in the memory of said computer system according to protocol processing of said headers and digests, the apparatus comprising:

(a) a packet data buffer containing at least one queue, each queue operational to store a mixture of complete packets and truncated packets (b) a retained data buffer containing at least one queue, each queue operational to store retained data that corresponds to one of the truncated packets stored within the packet data buffer such that the merger of the retained data and the truncated packet reconstitutes the original complete packet;

(c) a packet classifier that processes incoming packets, discards packets that do not comply with user defined rules, and determines the target queue wherein the packet data is to be stored within the packet data buffer and optionally within the retained data buffer;

(d) a retained packet classifier that processes incoming packets and determines if each incoming complete packet is eligible to be split into two parts: a truncated packet for storage in the packet data buffer and a remaining retained data portion for storage in the retained data buffer;

(e) a retained data buffer manager that splits eligible complete packets into a truncated packet and a retained data, and optionally writes the retained data to said retained data buffer, reads the retained data from said retained data buffer, creates and destroys a plurality of retained data tags, and manages the fill level of the retained data buffer;

(f) a packet buffer manager that
    writes the data of the complete packets and the truncated packets to the packet data buffer;
    reads a first descriptor data structure from the first plurality of descriptor data structures said first descriptor data structure brine located in a first destination of the memory of the computer system and comprising a plurality of information entries of which at least one information entry comprises at least one address of a second destination in the memory of the computer system and the corresponding length of the second destination;
    reads each of said data of said packets or truncated packets from said packet data buffer;
    conveys data of each said packets or truncated packets to a DMA engine;
    instructs a DMA engine to write data of each of said the complete packet or the truncated packet to the second destination in the memory of said computer system, the address of the second destination being specified within the first descriptor data structure;
    inserts into the first descriptor data structure at the first destination in the memory of the computer system information comprising said summary of processed headers and digests of said packet or truncated packet, a descriptor ready flag, a packet information area field the retained data tag, and a retained data tag field flag; and
    manages the fill level of said packet data buffer;

(g) a DMA engine that transfers said data of complete packets and truncated packets from the packet data buffer and retained data from the retained data buffer to the memory of the said computer system as instructed by either the packet buffer manager or the retained data buffer manager; and (h) a retained data write processor that
    reads a second descriptor data structure from the second plurality of data structures, said second descriptor data structure located at a fourth destination in the computer system memory and comprising a plurality of information entries of which at least one information entry comprises at least one address of a fifth destination in the memory and the corresponding length of the fifth destination and of which another information entry comprises the retained data tag for the retained data;

reads the retained data corresponding to retained data tag from the retained data buffer;

transfers data from the retained data buffer to the fifth destination in the memory of said computer system through the operation of said DMA engine;

inserts into the said second descriptor data structure at the fourth destination in the memory information comprising a descriptor ready flag and an operation completion status field to convey the status of transfer of retained data from the retained data buffer to the fifth destination in the memory of said computer system; and deletes the retained data from the retained data buffer.

24. The apparatus of claim 23 wherein the retained packet classifier uses a look-up table function to determine whether to store said data from said packets into the retained data buffer.

25. The apparatus of claim 23 further comprising a retained data watchdog timer that limits the duration of storage for the retained data within the retained data buffer.

* * * * *